(12) United States Patent
Minoda et al.

(10) Patent No.: US 7,482,063 B2
(45) Date of Patent: Jan. 27, 2009

(54) MOLDED OBJECT OBTAINED BY IN-MOLD COATING AND PROCESS FOR PRODUCING THE SAME

(75) Inventors: Takeshi Minoda, Sodegaura (JP); Yuichi Matsuda, Sodegaura (JP); Kaoru Yorita, Sodegaura (JP); Kenji Yonemochi, Komaki (JP); Kenji Oota, Komaki (JP); Etsuo Okahara, Ube (JP); Toshio Arai, Ube (JP)

(73) Assignees: Prime Polymer Co., Ltd., Tokyo (JP); Dai Nippon Toryo Co., Ltd., Osaka (JP); Ube Machinery Corporation, Ltd., Ube (JP)

( * ) Notice: Subject to any disclaimer, the term of this patent is extended or adjusted under 35 U.S.C. 154(b) by 526 days.

(21) Appl. No.: 10/525,383
(22) PCT Filed: Aug. 21, 2003
(86) PCT No.: PCT/JP03/10568
§ 371 (c)(1), (2), (4) Date: Feb. 23, 2005
(87) PCT Pub. No.: WO2004/018177
PCT Pub. Date: Mar. 4, 2004

(65) Prior Publication Data
US 2005/0214559 A1 Sep. 29, 2005

(30) Foreign Application Priority Data
Aug. 23, 2002 (JP) ............................ 2002-244160

(51) Int. Cl.
B32B 25/04 (2006.01)
B32B 27/26 (2006.01)
B32B 27/30 (2006.01)
B32B 27/32 (2006.01)
B32B 37/10 (2006.01)

(52) U.S. Cl. ................ 428/520; 428/500; 428/515; 428/516; 428/522; 428/523; 264/241; 264/250; 264/255; 264/271.1; 264/279; 264/279.1; 264/328.1; 264/328.7; 264/328.8; 264/328.14; 264/330; 264/331.1; 264/331.11; 264/331.15; 264/331.18; 264/331.21; 525/70; 525/78; 525/80; 525/88; 525/94; 525/244; 525/259; 525/262; 525/263; 525/298; 525/301; 525/302; 525/304

(58) Field of Classification Search ...................... None
See application file for complete search history.

(56) References Cited

U.S. PATENT DOCUMENTS 4,225,109 A * 9/1980 Yotsutsuji et al. ........... 249/111

(Continued)

FOREIGN PATENT DOCUMENTS

EP 733558 A2 9/1996

*Primary Examiner*—Vivian Chen
(74) *Attorney, Agent, or Firm*—Birch, Stewart, Kolasch & Birch, LLP

(57) ABSTRACT

An in-mold coating molded article is obtained by coating the surface of a resin molded product comprising a hydroxyl group-containing polypropylene resin composition (A) with a paint composition for in-mold coating, wherein the composition (A) comprises a polypropylene resin (i), an additive rubber (ii) and optionally a polymer compound (iii) other than the polypropylene resin (i) and the additive rubber (ii), the total hydroxyl value of the polypropylene resin (i), the additive rubber (ii) and the optional polymer compound (iii) is from 1 to 40, the composition (A) has a rubber component content (total of the amount of the additive rubber (ii) and the amount of components soluble in n-decane at 23° C. of the polypropylene resin (i) and the optional polymer compound (iii)) of from 15 to 80% by mass based on 100% by mass of the total amount of the rubber component and the resin component other than the rubber component, the paint composition comprises a vehicle component comprising 10 to 70% by mass of an oligomer having at least two (meth)acrylate groups and 90 to 30% by mass of an ethylenically unsaturated monomer copolymerizable with the oligomer, a (meth)acryl modified chlorinated polyolefin having a chlorine content of from 2 to 40% by mass, an organic peroxide polymerization initiator, and a polyisocyanate compound.

9 Claims, 1 Drawing Sheet

U.S. PATENT DOCUMENTS

| | | | |
|---|---|---|---|
| 4,293,659 A * | 10/1981 | Svoboda | 525/28 |
| 4,414,173 A * | 11/1983 | Cobbledick et al. | 264/257 |
| 4,515,710 A * | 5/1985 | Cobbledick | 252/511 |
| 4,795,785 A * | 1/1989 | Ito et al. | 525/288 |
| 5,130,373 A * | 7/1992 | Ashihara et al. | 525/193 |
| 5,276,093 A * | 1/1994 | Kitagawa et al. | 525/89 |
| 5,395,893 A * | 3/1995 | Suehiro et al. | 524/280 |
| 5,425,926 A * | 6/1995 | Kunikiyo et al. | 427/393.5 |
| 5,462,987 A * | 10/1995 | Shinonaga et al. | 524/451 |
| 5,556,910 A * | 9/1996 | Harada et al. | 524/504 |
| 5,573,856 A * | 11/1996 | Shinonaga et al. | 428/424.8 |
| 5,587,418 A * | 12/1996 | Sasaki et al. | 524/504 |
| 5,614,581 A * | 3/1997 | Cobbledick et al. | 524/495 |
| 5,658,672 A * | 8/1997 | Lenke et al. | 428/423.1 |
| 5,728,342 A * | 3/1998 | Wirt et al. | 264/259 |
| 6,180,043 B1 * | 1/2001 | Yonemochi et al. | 264/255 |
| 6,617,033 B1 * | 9/2003 | Straus et al. | 428/424.2 |
| 6,793,861 B2 * | 9/2004 | McBain et al. | 264/255 |
| 6,875,389 B2 * | 4/2005 | Straus et al. | 264/255 |
| 6,958,127 B1 * | 10/2005 | Suzuki et al. | 264/40.1 |
| 7,045,213 B2 * | 5/2006 | Straus | 428/412 |
| 7,105,231 B2 * | 9/2006 | McBain et al. | 428/412 |
| 7,300,977 B2 * | 11/2007 | Najima et al. | 525/64 |
| 2007/0160861 A1 * | 7/2007 | Shinoda et al. | 428/522 |

FOREIGN PATENT DOCUMENTS

| | | | |
|---|---|---|---|
| EP | 934808 A2 | | 9/1996 |
| EP | 1207031 A1 | | 5/2002 |
| JP | 08-034860 | * | 2/1966 |
| JP | 06-107750 | * | 4/1994 |
| JP | 6-107750 A | | 4/1994 |
| JP | 08-034860 | * | 2/1996 |
| JP | 8-34860 A | | 2/1996 |
| JP | 08-048801 | * | 2/1998 |
| JP | 10-030040 | * | 2/1998 |
| JP | 10-139975 | * | 5/1998 |
| JP | 11-005060 | * | 1/1999 |
| JP | 2001-151977 | * | 6/2001 |
| JP | 2001-170964 | * | 6/2001 |
| JP | 2001-170964 A | | 6/2001 |
| JP | 2002-188043 | * | 7/2002 |
| JP | 2002-225075 | * | 8/2002 |
| JP | 2002-225075 A | | 8/2002 |
| JP | 2003-138165 | * | 5/2003 |
| JP | 2003-138165 A | | 5/2003 |

* cited by examiner

MOLDED OBJECT OBTAINED BY IN-MOLD COATING AND PROCESS FOR PRODUCING THE SAME

TECHNICAL FIELD

The present invention relates to an in-mold coating molded article and a process for preparing the article, more specifically an in-mold coating molded article obtained by a method of coating and molding in the mold (in-mold coating method) such that a thermoplastic resin material is molded in a mold by an injection molding method, injection compression molding method or injection press molding method, a paint for coating in the mold is injected into between the surface of a resulting resin molded product and the mold cavity surface, this paint is cured in the mold and thereby a monolithic molded article such that the paint is adhered on the surface of the resin molded product is prepared, and it relates to a preparation process thereof.

TECHNICAL BACKGROUND

Until now, coating application on the surface of a molded article has been widely carried out in order to give an additional value such as decoration properties or the like to resin molded articles used for automobiles, electrical appliances or building materials, or to prolong the lifetime of products by enhancing weathering resistance.

As such a coating method, it is general to employ a spray coating method. Recently, the environmental problems have been strongly concerned, so that the urgent development of a technique in place of spray coating has been desired. This is because there is a tendency to set a strict limit to release of hazardous organic substances discharged from various factories to the atmosphere, and is from the standpoint of making much of the health care for employees. Under the circumstances, noted is a method of coating and molding in the mold such that a paint is injected into between the surface of a resin molded product molded in a mold and the mold cavity surface, this paint is cured in the mold, and thereby a monolithic molded article wherein the coating is adhered on the surface of the resin molded product is prepared (in-mold coating, hereinafter referred to as "IMC"). It is expected that this IMC method not only improve the quality of the molded article's surface by adhering a coating on the surface but also decrease costs by decreasing the coating steps.

By reason that the paint used for in-mold coating molding of a thermoplastic resin is desired to have curing properties capable of curing at a temperature lower than the curing temperature of a paint for thermosetting resins, it is generally difficult to develop a paint having both of coating appearance and adhesion. Therefore, paints which have been already developed as a paint used for the in-mold coating molding method are limited to paints used for thermosetting resins and paints used for some thermoplastic resins such as nylon, ABS resins and the like. On this account, the kind of synthetic resins applicable to the in-mold coating molding method is limited to the thermosetting resins or some thermoplastic resins such as nylon, ABS resins and the like at present. Further, it has been considered that it is technically difficult in the structure of the resins to develop paints having sufficient adhesion to olefin resins such as polypropylene resin or polyethylene resin.

Furthermore, it is also difficult in the structure of olefin resins such as polypropylene resin or polyethylene resin to adhere the paint to the olefin resins even by the general spray coating method. Therefore, for the olefin resins, a method of coating the resin surface with an intermediate layer such as primer or the like and then coating the coated primer surface with a paint is employed.

Accordingly, it has been considered that it is technically very difficult to develop a polypropylene resin composition having sufficient coating adhesion in an in-mold one-component coating molding method such as IMC.

As a method of applying the in-mold coating molding method to the polyolefin resin, JP-A-2001-170964 discloses a method such that on the polyolefin resin surface, a skin material having good adhesion with a paint is molded with lamination, the paint is injected into between the surface of the skin material and the mold cavity surface to thereby prepare a molded article with a coating monolithically formed on the polyolefin resin surface through the skin material.

Under the circumstances, the present inventors have earnestly been studied and found that using a paint for in-mold coating prepared by adding in a specific ratio acryl modified chlorinated polyolefin containing a specific amount of chlorine, an organic peroxide and polyisocyanate to a vehicle component comprising an oligomer having a (meth)acrylate group and an ethylenically unsaturated monomer capable of copolymerizing with the oligomer, and a hydroxyl group-containing polypropylene resin composition having a specific hydroxyl value and containing a specific amount of rubber components, there can be obtained an in-mold coating molded article that the above paint for coating is monolithically formed on the surface of the resin molded product of the polypropylene resin composition, which is a polyolefin resin, in such a state as to have good adhesion. Accordingly, the present invention has been accomplished.

OBJECT OF THE INVENTION

The present invention is intended to solve the problems associated with the prior art as described above. It is an object of the present invention to provide an in-mold coating molded article having a coating of a paint for in-mold coating monolithically formed on the surface of a resin molded product of a polypropylene resin composition, which is a polyolefin resin, in such a state as to have good adhesion. It is another object of the present invention to provide a process for preparing the in-mold coating molded article.

DISCLOSURE OF THE INVENTION

The in-mold coating molded article according to the present invention is obtained by coating the surface of a resin molded product comprising a hydroxyl group-containing polypropylene resin composition (A) with a paint composition for in-mold coating (B), wherein the hydroxyl group-containing polypropylene resin composition (A) comprises a polypropylene resin (i), an additive rubber (ii) and optionally a polymer compound (iii) other than the polypropylene resin (i) and the additive rubber (ii), the total hydroxyl value of the polypropylene resin (i), the additive rubber (ii) and the optional polymer compound (iii) is from 1 to 40 (KOH mg/g), the hydroxyl group-containing polypropylene resin composition (A) has a rubber component content (total of the amount of the additive rubber (ii) and the amount of components soluble in n-decane at 23° C. of the polypropylene resin (i) and the optional polymer compound (iii)) of from 15 to 80% by mass based on 100% by mass of the total amount of the rubber component and the resin component other than the rubber component, the paint composition for in-mold coating (B) comprises:

100 parts by mass of a vehicle component (a) comprising 10 to 70% by mass of an oligomer having at least two (meth) acrylate groups and 90 to 30% by mass of an ethylenically unsaturated monomer copolymerizable with the oligomer, 5 to 35 parts by mass of a (meth)acryl modified chlorinated polyolefin (b) having a chlorine content of from 2 to 40% by mass, 0.5 to 5 parts by mass of an organic peroxide polymerization initiator (c), and 2 to 20 parts by mass of a polyisocyanate compound (d).

The hydroxyl group-containing polypropylene resin composition (A) is preferably a polypropylene resin composition containing a hydroxyl group-containing polypropylene resin component.

The additive rubber (ii) contained in the hydroxyl group-containing polypropylene resin composition (A) is preferably an ethylene.α-olefin copolymer.

The hydroxyl group-containing polypropylene resin composition (A) may contain an inorganic filler.

The first process for producing an in-mold coating molded article according to the present invention comprises:

injecting a melt of the hydroxyl group-containing polypropylene resin composition (A) into a mold cavity of a mold composed of a stationary mold and a movable mold with keeping the mold under a prescribed mold clamping pressure at a mold temperature lower than the melting point of the polypropylene resin component in the hydroxyl group-containing polypropylene resin composition (A) and not less than the temperature at which the paint composition (B) for in-mold coating is cured, cooling and solidifying the melt in an extent of withstanding the fluid pressure of the paint composition (B) by hold pressure application for a prescribed time, opening the mold slightly to form an interspace between the resulting resin molded product and the mold cavity surface, injecting the paint composition (B) into the interspace, increasing the mold clamping pressure again and maintaining the mold clamping condition to cure the paint composition (B), and then taking out an in-mold coating molded article.

The second process for producing an in-mold coating molded article according to the present invention comprises:

injecting a melt of the hydroxyl group-containing polypropylene resin composition (A) into a mold cavity of a mold composed of a stationary mold and a movable mold with keeping the mold under a prescribed primary mold clamping pressure at a mold temperature lower than the melting point of the polypropylene resin component in the hydroxyl group-containing polypropylene resin composition (A) and not less than the temperature at which the paint composition for in-mold coating (B) is cured, during the injection or after completion of the injection, increasing the mold clamping force to a secondary mold clamping force, keeping the melt for a prescribed time to cool and solidify the melt in an extent capable of withstanding the fluid pressure of the paint composition (B), and thereafter opening the mold slightly to form an interspace between the resulting resin molded product and the mold cavity surface, injecting the paint composition (B) into the interspace, increasing the mold clamping pressure again and maintaining the mold clamping condition to cure the paint composition (B), and then taking out an in-mold coating molded article.

The third process for producing an in-mold coating molded article according to the present invention comprises:

injecting a melt of the hydroxyl group-containing polypropylene resin composition (A) into a mold cavity of a mold composed of a stationary mold and a movable mold, with keeping the mold at a mold temperature lower than the melting point of the polypropylene resin component in the hydroxyl group-containing polypropylene resin composition (A) and not less than the temperature at which the paint composition for in-mold coating (B) is cured, in a state that the mold is opened with a prescribed opening, during the injection or after completion of the injection, increasing the mold clamping force to a prescribed mold clamping force and keeping the melt for a prescribed time to cool and solidify the melt in an extent capable of withstanding the fluid pressure of the paint composition (B), opening the mold slightly to form a space between the resulting resin molded product and the mold cavity surface, injecting the paint composition (B) into the space, increasing the mold clamping pressure again and maintaining the mold clamping condition to cure the paint composition (B), and then taking out an in-mold coating molded article.

BEST MODE FOR CARRYING OUT THE INVENTION

Figure 1:
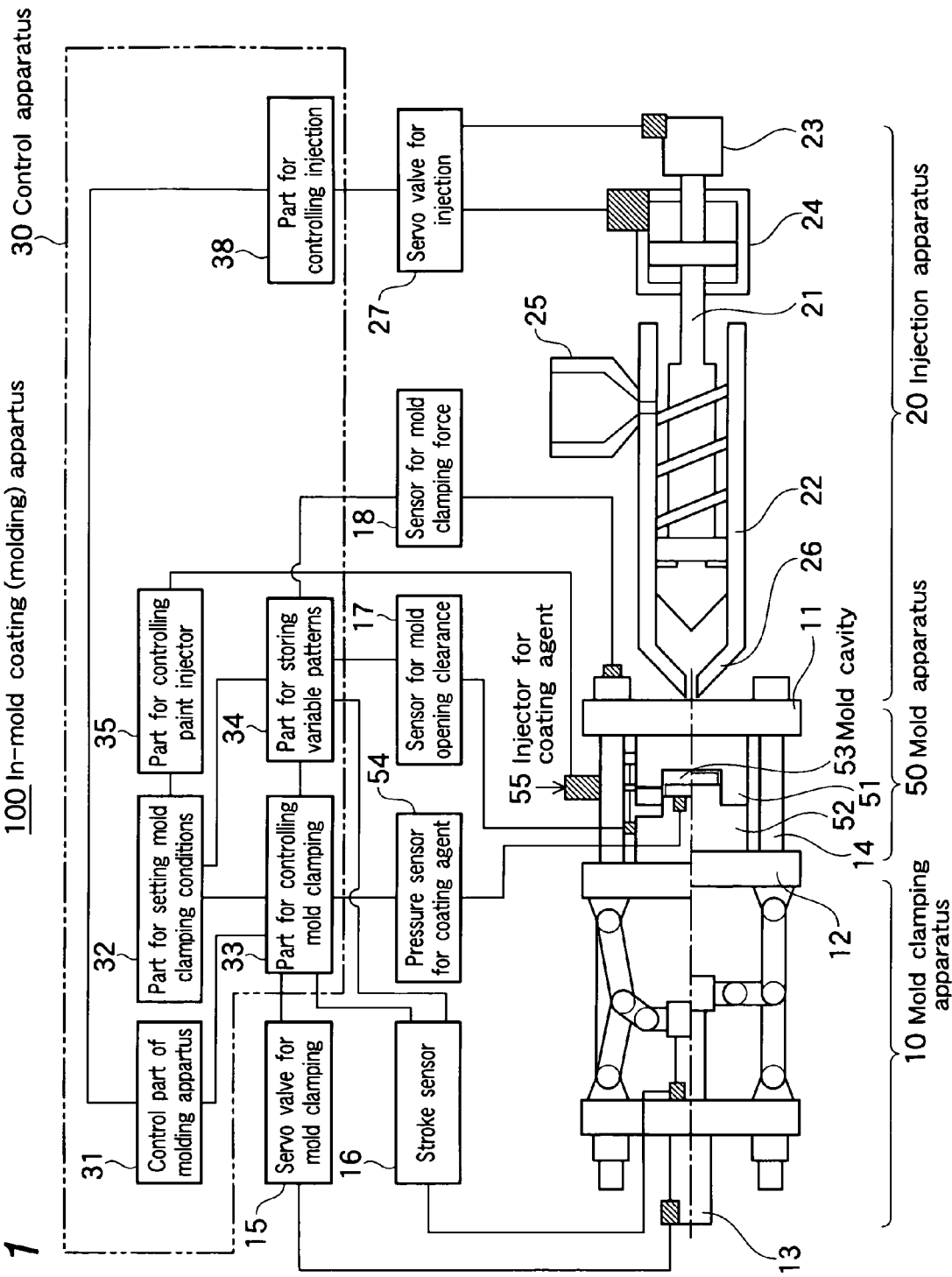
FIG. 1 is an illustrative view showing the whole structure of an in-mold coating (molding) apparatus used in a process for preparing an in-mold coating molded article according to the present invention. In the figure, the number 10 shows a mold clamping apparatus, 11 shows a stationary platen, 12 shows a moving platen, 13 shows a mold clamping cylinder, 14 shows a tie rod, 15 shows a servo valve for mold clamping, 16 shows a stroke sensor, 17 shows a sensor for mold opening clearance, 18 shows a sensor for mold clamping force, 20 shows an injection apparatus, 21 shows a screw, 22 shows a barrel, 23 shows a hydraulic motor, 24 shows an injection cylinder, 25 shows a hopper, 26 shows a nozzle, 27 shows a servo valve for injection, 30 shows a control apparatus, 31 shows a control part of molding apparatus, 32 shows a part for setting mold clamping conditions, 33 shows a part for controlling mold clamping, 34 shows a part for storing variable patterns, 35 shows a part for controlling paint injector, 38 shows a part for controlling injection, 50 shows a mold apparatus, 51 shows a stationary mold, 52 shows a movable-mold, 53 shows a mold cavity, 54 shows a pressure sensor for coating agent (paint), 55 shows a injector for coating agent (paint) and 100 shows an in-mold coating (molding) apparatus.

Hereinafter, the in-mold coating molded article according to the present invention and the preparation process thereof are described in detail.

The in-mold coating molded article according to the present invention comprises a resin molded product formed from a hydroxyl group-containing polypropylene resin composition (A) and a coating film of a paint composition for in-mold coating (B) formed on the surface of the resin molded product.

First, the hydroxyl group-containing polypropylene resin composition (A) is described.

Hydroxyl Group-containing Polypropylene Resin Composition (A)

The hydroxyl group-containing polypropylene resin composition (A) used in the present invention comprises a polypropylene resin (i) and an additive rubber (ii), and optionally further comprises the other polymer compound (iii) and various kinds of additives such as inorganic fillers, color pigments and the like. At least one component of the polypropylene resin (i), the additive rubber (ii) and the other polymer compound (iii) has a hydroxyl group.

That is, the hydroxyl group-containing polypropylene resin composition (A) comprises a thermoplastic component composed of the polypropylene resin (i), the additive rubber (ii) and the other polymer compound (iii) optionally added, and an inorganic component optionally added such as an inorganic filler (for example, talc) Namely, it comprises the resin component, the rubber component and optionally the inorganic component such as an inorganic filler (for example, talc). The rubber component used herein is the total of the amount of the added rubber contained in the thermoplastic component and the amount of the soluble part in n-decane at 23° C. contained in the polypropylene resin (i) and the polymer compound (iii). The resin component is a residual component obtained by removing the rubber component from the thermoplastic component.

Examples of the polypropylene resin (i) may include a propylene homopolymer, a propylene block copolymer, a propylene random copolymer, components prepared by modifying these polymers with a hydroxyl group-containing compound, a hydroxyl group-containing propylene homopolymer, a hydroxyl group-containing propylene block copolymer and a hydroxyl group-containing propylene random copolymer.

Examples of the additive rubber (ii) may include thermoplastic rubber such as an ethylene α-olefin copolymer, a styrene rubber and the like.

Examples of the polymer compound (iii) optionally added may include thermoplastic polymer compounds such as polyethylene and the like, and a thermoplastic polymer compound modified with a hydroxyl group-containing compound.

The hydroxyl group-containing polypropylene resin composition (A) used in the present invention comprises the polypropylene resin (i) and the additive rubber (ii), and optionally further comprises the other polymer compound (iii) and various kinds of additives such as inorganic fillers, color pigments and the like. At least one component of the polypropylene resin (i), the additive rubber (ii) and the other polymer compound (iii) has a hydroxyl group. Based on 100% by mass of the total amount of the thermoplastic component of the polypropylene resin (i), the additive rubber (ii) and the other polymer compound (iii) optionally added, the amount of the rubber component is from 15 to 80% by mass.

As the polypropylene resin (i), it is possible to use a polypropylene obtainable by polymerization with a known method. Examples thereof include a propylene homopolymer, and a block copolymer or a random copolymer both which contain a structural unit derived from propylene and a structural unit derived from α-olefins of 2 to 12 carbon atoms excluding propylene.

As the α-olefins of 2 to 12 carbon atoms excluding propylene, it is possible to use known ones. Examples thereof include chain-like α-olefins such as ethylene, butene-1, pentene-1, hexene-1, heptene-1, octene-1, nonene-1, decene-1, 4-methylpentene-1, 4-methylhexene-1, 4,4-dimethylpenetene, and cyclic α-olefins such as cyclopentene and cyclohexene. These α-olefins may be used singly or in combination of two or more.

The propylene random copolymer contains the comonomer in an amount of from 0.5 to 20% by mole, preferably 1 to 15% by mole, more preferably 1 to 10% by mole. The propylene block copolymer contains the comonomer in an amount of from 0.5 to 50% by mole, preferably 1 to 40% by mole, more preferably 5 to 30% by mole.

The rubber used herein has rubber elasticity at ordinary temperature. The rubber component content is the total of the additive rubber (ii) and the components soluble in n-decane at 23° C. contained in the polypropylene resin (i) and the other polymer compound (iii).

The polymer compound (iii) is a polymer compound added to the polypropylene resin (i), excluding the additive rubber (ii).

As the polypropylene resin (i), the additive rubber (ii) and the polymer compound (iii), it is also possible to use ones having a polar group excluding hydroxyl group, such as amine group, ketone group, carboxyl group, glycidyl group and cyano group.

Examples of the method for preparing the hydroxyl group-containing polypropylene resin composition (A) may include:

(1) a method in which the additive rubber and optionally the polymer compound are added to at least one polymer selected from a propylene homopolymer, a propylene block, copolymer and a propylene random copolymer, and the mixture is modified with a hydroxyl group-containing compound and thereby the objective hydroxyl group-containing polypropylene resin composition (A) is prepared;

(2) a method in which the additive rubber and optionally the polymer compound are added to at least one modified polymer selected from a propylene homopolymer modified with a hydroxyl group-containing compound, a propylene block copolymer modified with a hydroxyl group-containing compound and a propylene random copolymer modified with a hydroxyl group-containing compound, and thereby the objective hydroxyl group-containing polypropylene resin composition (A) is prepared;

(3) a method in which the polypropylene resin component modified with a hydroxyl group-containing compound and/or the hydroxyl group-containing polypropylene resin component, the additive rubber and optionally the polymer compound are added to at least one polymer selected from a propylene homopolymer, a propylene block copolymer and a propylene random copolymer, and thereby the objective hydroxyl group-containing polypropylene resin composition (A) is prepared;

(4) a method in which the additive rubber and the hydroxyl group-containing polymer compound are added to at least one polymer selected from a propylene homopolymer, a propylene block copolymer and a propylene random copolymer, and thereby the objective hydroxyl group-containing polypropylene resin composition (A) is prepared; and (5) a method in which the additive rubber modified with a hydroxyl group-containing compound and/or the hydroxyl group-containing additive rubber, and optionally the polymer compound are added to at least one polymer selected from a propylene homopolymer, a propylene block copolymer and a propylene random copolymer, and thereby the objective hydroxyl group-containing polypropylene resin composition (A) is prepared. These methods may be used not only singly but also in combination.

The total amount of hydroxyl groups in the polypropylene resin (i), the additive rubber (ii) and the optional polymer compound (iii) other than the polypropylene resin (i) and the additive rubber (ii), namely the hydroxyl value is from 1 to 40 (KOH mg/g), preferably 2 to 30 (KOH mg/g), more preferably 2 to 20 (KOH mg/g).

When the hydroxyl value is less than 1 (KOH mg/g), the amount of hydroxyl groups in the hydroxyl group-containing polypropylene resin composition (A) is small, and thereby the wetting properties of the paint composition for in-mold coating (B) to the surface of the resin molded product made of the resin composition (A) is deteriorated and the amount of urethane bonding caused by the reaction of isocyanate group in the paint composition (B) with hydroxyl group in the resin composition (A) is decreased. Therefore, sufficient adhesion with the paint composition (B) cannot be obtained.

When the hydroxyl value is higher than 40 (KOH mg/g), the amount of hydroxyl groups in the resin composition (A) is too large and thereby the physical properties of the resin composition such as impact properties and the like are deteriorated or surface layer de-lamination is easily caused on the resin molded product surface in mold opening or in mold releasing of the resin molded product.

The hydroxyl value is the amount (mg) of potassium hydroxide (Mw=56) necessary to neutralize 1 g of the specimen.

An example of the method of preparing the hydroxyl group-containing polypropylene resin composition (A) used in the present invention include a method of adding the additive rubber (ii) and optionally the other polymer compound (iii) to at least one polymer selected from a propylene homopolymer, propylene block copolymer and propylene random copolymer as the polypropylene resin (i), reacting these components with a hydroxyl group-containing ethylenically unsaturated compound in the presence of an organic peroxide in an extruder and thereby preparing the hydroxyl group-containing polypropylene resin composition (A).

This hydroxyl group-containing ethylenically unsaturated compound is a compound having an ethylenically unsaturated bond and at least one hydroxyl group in one molecule.

Examples of the hydroxyl group-containing ethylenically unsaturated compound include (meth)acrylic esters such as
2-hydroxyethyl(meth)acrylate,
2-hydroxypropyl(meth)acrylate,
3-hydroxypropyl(meth)acrylate,
2-hydroxy-3-phenoxypropyl(meth)acrylate,
3-chloro-2-hydroxypropyl(meth)acrylate,
glycerin mono(meth)acrylate,
pentaerythritol mono(meth)acrylate,
trimethylolpropane (meth)acrylate,
tetramethylolethane mono(meth)acrylate,
butanediol mono(meth)acrylate,
polyethyleneglycol mono(meth)acrylate and
2-(6-hydroxyhexanoyloxy)ethylacrylate.

Hereupon, "(meth)acryl" means "acryl" and/or "methacryl".

Furthermore, as the hydroxyl group-containing ethylenically unsaturated compound, it is also possible to use 10-undecene-1-ol, 1-octene-3-ol, 2-methanolnorbornene, hydroxystyrene, hydroxyethylvinylether, hydroxybutyl vinylether, N-methylolacrylamide, 2-(meth)acryloyloxyethyl acid phosphate, glycelin monoallylether, allylalcohol, allyloxyethanol, 2-butene-1,4-diol and glycelin monoalcohol.

Of these hydroxyl group-containing ethylenically unsaturated compounds, 2-hydroxyethyl(meth)acrylate and 2-hydroxypropyl(meth)acrylate are preferred. The hydroxyl group-containing ethylenically unsaturated compounds may be used singly or in combination of two or more.

Examples of the organic peroxide include peroxyketals such as
1,1-bis(t-butylperoxy)-3,3,5-trimethylcyclohexane,
1,1-bis(t-butylperxoy)cyclohexane,
2,2-bis(t-butylperoxy)octane,
n-butyl-4,4-bis-(t-butylperoxy)valarate and
2,2-bis(t-butylperoxy)butane;

dialkylperoxides such as di-t-butylperoxide, dicumylperoxide, t-butylcumylperoxide, $\alpha,\alpha'$-bis (t-butylperoxy)hexane, 2,5-dimethyl-2,5-bis(t-butylperoxy)hexane and 2,5-dimethyl-2,5-bis(t-butylperoxy)hexyne-3;

diacylperoxides such as acetylperoxide, isobutyloxide, octanoylperoxide, decanoylperoxide, lauroylperoxide, 3,5,5-trimethylhexanoylperoxide, benzoylperoxide, 2,5-dichlorobenzoylperoxide and m-trioylperoxide;

peroxy esters such as t-butyloxy acetate, t-butylperoxy isobutylate, t-butylperoxy-2-ethylhexanoate, t-butylperoxy laurylate, t-butylperoxy benzoate, di-t-butylperoxy isophthalate, 2,5-dimethyl-2,5-bis(benzoylperoxy)hexane, t-butylperoxy maleic acid, t-butylperoxy isopropyl carbonate and cumylperoxy octate;

peroxy dicarbonates such as di(2-ethylhexyl)peroxy dicarbonate and di(3-methyl-3-methoxybutyl)peroxy dicarbonate;

hydroperoxides such as t-butyl hydroperoxide, cumen hydroperoxide, diisopropylbenezene hydroperoxide, 2,5-dimethylhexane-2,5-dihydroperoxide and 1,1,3,3-tetramethylbutyl hydroperoxide; and organic peroxides generally used in the industry without particular limitation. Of these organic peroxides, t-butyl peroxybenzoate, 2,5-dimethyl-2,5-bis(t-butylperoxy)hexane, t-butylperoxy-2-ethyl hexanoate, and dicumyl peroxide are preferred.

The method for preparing the hydroxyl group-containing polypropylene resin composition (A) is addition of a hydroxyl group-containing polypropylene resin component. An example of the method of introducing hydroxyl group into the polypropylene resin component to be added include a method of allowing the polypropylene resin component to react with the hydroxyl group-containing ethylenically unsaturated compound such as hydroxymethyl methacrylate and the like in the presence of the organic peroxide in an extruder.

Examples of the polypropylene resin component to which hydroxyl group is introduced include propylene homopolymer, propylene block copolymer and propylene random copolymer of these, propylene homopolymer is preferred.

The method for preparing the hydroxyl group-containing polypropylene resin composition (A) is addition of a hydroxyl group-containing rubber. An example of the method of introducing hydroxyl group into the rubber to be added include a method of allowing the rubber to react with the hydroxyl group-containing ethylenically unsaturated compound in the presence of the organic peroxide in an extruder.

The hydroxyl group-containing polymer compound added in the method for preparing the hydroxyl group-containing polypropylene resin composition (A) may be a thermoplastic polymer compound capable of introducing hydroxyl groups.

An example of the method of introducing hydroxyl groups into the polymer compound to be added include a method of allowing the polymer compound to react with the hydroxyl group-containing ethylenically unsaturated compound in the presence of an organic peroxide in an extruder.

As the hydroxyl group-containing polypropylene resin composition (A) is a polypropylene type, the hydroxyl group-containing polypropylene resin component modified with a compound containing a hydroxyl group such as hydroxymethyl methacrylate and the like is preferred as the hydroxyl group-containing component to be added, because of having favorable compatibility, rather than the hydroxyl group-containing rubber or the hydroxyl group-containing polymer compound.

A compatibilizing agent capable of increasing compatibility may be added so that the hydroxyl group-containing rubber, the hydroxyl group-containing polypropylene resin component and the hydroxyl group-containing polymer compound can be mixed with good dispersibility in the hydroxyl group-containing polypropylene resin composition (A).

The rubber component content in the hydroxyl group-containing polypropylene resin composition (A) is the total amount of the amount of the additive rubber (ii) and the amount of the components soluble in n-decane at 23° C. in the polypropylene resin (i) and the other polymer compound (iii).

When the total amount of the thermoplastic component composed of the polypropylene resin (i), the additive rubber (ii) and the polymer compound (iii) optionally added is 100% by mass, the rubber component content is from 15 to 80% by mass, preferably 15 to 70% by mass, more preferably 20 to 60% by mass. That is, the total amount of the resin components in the resin composition (A) is from 20 to 85% by mass, preferably 30 to 85% by mass, more preferably 40 to 80% by mass.

Using the hydroxyl group-containing polypropylene resin composition (A) having the rubber component content in the above range, it is possible to prepare a monolithically molded article having good adhesion with the paint composition (B).

For example, when the hydroxyl group-containing polypropylene resin composition (A) consists of the propylene homopolymer, the additive rubber, the hydroxyl group-containing polypropylene resin component prepared by modifying the propylene homopolymer and the inorganic filler, the amount of the rubber component corresponds to the amount of the additive rubber, and the rubber component content is represented by the content on the basis of the amount of the thermoplastic component excluding the inorganic filler (the total amount of the propylene homopolymer, the added rubber and the hydroxyl group-containing polypropylene resin component) being 100% by mass.

Further, when the hydroxyl group-containing polypropylene resin composition (A) consists of the propylene block copolymer, the additive rubber, the hydroxyl group-containing polypropylene resin component prepared by modifying the propylene homopolymer and the inorganic filler, the amount of the rubber component is the total amount of the added rubber and the ethylene-propylene copolymer in the propylene block copolymer, and the rubber component content is represented by the total amount on the basis of the amount of the thermoplastic component excluding the inorganic filler (the total amount of propylene block copolymer, the added rubber and the hydroxyl group-containing polypropylene resin component) being 100% by mass.

The amount of the ethylene-propylene copolymer in the propylene block copolymer is represented by the amount of the component soluble in n-decane at room temperature (% by mass)

The amount of the component soluble in n-decane at room temperature (23° C.) is measured in the following manner.

Namely, to a 1 L flask equipped with a stirrer, 3 g of a polymer specimen, 20 mg of 2,6-di-tert-butyl-4-methylphenol and 500 ml of n-decane are fed and dissolved with heating on an oil bath at 145° C. After the polymer specimen is dissolved, the solution is cooled to room temperature over about 8 hr and successively maintained on a water bath at 23° C. for 8 hr.

The precipitated polymer and the n-decane solution containing the dissolved polymer are separated by filtration with a G-4 or G-2 glass filter. The solution thus prepared is heated at 10 mmHg and 150° C. to dryness until the polymer dissolved in the n-decane solution is in the constant amount, and the mass thereof is determined to be the amount of the component soluble in decane at 23° C. The amount of the component soluble in decane at 23° C. of the propylene block polymer is calculated as a percentage to the mass of the polymer specimen.

Examples of the added rubber may include ethylene.α-olefin copolymers such as ethylene-butene copolymer, ethylene.octene copolymer or ethylene.propylene copolymer and SEBS (styrene-ethylene.butylene-styrene block copolymer). In the present invention, rubbers other than these rubbers can be also used as the added rubber.

The adhesion of the paint composition (B) and the resin composition (A) is enhanced because it is considered that by adding the above rubber, the chlorinated polyolefin component contained in the paint composition for in-mold coating partly penetrates into the rubber orientated on the surface of a resin molded product of the hydroxyl group-containing polypropylene resin composition (A) and swells, and thereby they are bonded.

The additive rubber desirably has a Mooney viscosity ML (1+4) (100° C.) of preferably from 5 to 60, more preferably 10 to 45. When the rubber has a Mooney viscosity of less than 5, delamination is easily caused on the surface of the resin molded product in mold opening or in releasing the mold. When the rubber has a Mooney viscosity of more than 60, the adhesion of the resin molded product with the paint composition for in-mold coating (B) is decreased because the rubber of the surface layer of the resin molded product is not orientated nor flattened even if the resin composition (A) is injection molded.

In order to improve the rigidity of the resin molded product of the hydroxyl group-containing polypropylene resin composition (A), the inorganic filler can be added in accordance with necessity without missing the object of the present invention.

Examples of the inorganic filler may include talc and calcium carbonate. The inorganic filler is used in an amount of usually from 0.1 to 60% by mass based on 100% by mass of the resin composition (A).

Furthermore, a heat stabilizer, a weathering stabilizer, various additives, color pigments, which do not hinder curing of the paint composition for in-mold coating (B), can be added to the hydroxyl group-containing polypropylene resin composition (A) in accordance with the object.

The hydroxyl group-containing polypropylene resin composition (A) used in the present invention is preferably a resin composition that comprises:

at least one polypropylene selected from a propylene homopolymer, propylene block copolymer and propylene random copolymer in an amount of from 20 to 95% by mass, preferably 25 to 90% by mass as the polypropylene resin (i), and the additive rubber (ii) in an amount of from 5 to 80% by mass, preferably 10 to 75% by mass provided that the total amount of the polypropylene resin (i) and the additive rubber (ii) is 100% by mass, wherein at least one of the polypropylene and the rubber has a hydroxyl group, and the resin composition has a hydroxyl value of from 1 to 40 (KOH mg/g); or a resin composition that comprises:

at least one polypropylene selected from a propylene homopolymer, propylene block copolymer and propylene random copolymer in an amount of from 20 to 95% by mass, preferably 25 to 90% by mass as the polypropylene resin (i), the additive rubber (ii) in an amount of from 5 to 80% by mass, preferably 10 to 75% by mass provided that the total amount of the polypropylene resin (i) and the additive rubber (ii) is 100% by mass, and the polymer compound (iii) other than the polypropylene resin (i) and the additive rubber (ii) in an amount of from 1 to 60% by mass, preferably 1 to 50% by mass based on 100% by mass of the total amount of the polypropylene resin (i) and the additive rubber (ii), wherein at least one of the polypropylene resin (i), the additive rubber (ii) and the polymer compound (iii) has a hydroxyl group, and the resin composition has a hydroxyl value of from 1 to 40 (KOH mg/g).

In accordance with necessity, to these resin compositions, the inorganic filler may be added in an amount of from 1 to 60% by mass, preferably 1 to 50% by mass and the pigment may be added in an amount of from 1 to 10% by mass, based on 100% by mass of the total amount of the polypropylene resin (i) and the additive rubber (ii).

Examples of the additive rubber (ii) may include ethylene.α-olefin copolymers such as ethylene.butene copolymer, ethylene.octene copolymer and ethylene-propylene copolymer, and SEBS (styrene-ethylene.butylene-styrene block copolymer). Of these, ethylene.α-olefin copolymers are preferred from the standpoint of their economical costs.

This additive rubber (ii) is not necessarily the same as the above described rubber component. For example, the rubber described herein does not include the components soluble in n-decane at 23° C. in the polypropylene resin component such as propylene block copolymer and the like, and the components soluble in n-decane at 23° C. in the polymer compound.

Examples of the polymer compound (iii) other than the polypropylene resin (i) and the additive rubber (ii) may include α-olefin polymers other than polypropylene, such as polyethylene and polybutene, and linear low-density polyethylenes prepared by copolymerizing ethylene and an α-olefin of 4 to 20 carbon atoms, preferably α-olefin of 4 to 12 carbon atoms. The linear low-density polyethylenes have an α-olefin content of about from 1 to 10% by mole, preferably about 1.5 to 8% by mol.

The linear polyethylenes prepared by copolymerizing an α-olefin preferably have a density of about from 0.900 to 0.920 g/cm$^3$ because of having an excellent effect of improving the impact strength.

Examples of the color pigments may include carbon black, iron black and titanium white, and the color pigments incapable of hindering the curing of the paint composition for in-mold coating (B) can be added in accordance with necessity.

Among the hydroxyl group-containing polypropylene resin compositions (A) preferably used, it is particularly preferred to-use, for example, the resin composition comprised of 45 to 65% by mass of the propylene block copolymer, 20 to 40% by mass of the hydroxyl group-containing propylene homopolymer (hydroxyl group modified product of propylene homopolymer), 15 to 35% by mass of the additive rubber and 10 to 30% by mass of talc, provided that the total amount of the propylene block copolymer, the hydroxyl group-containing propylene homopolymer and the additive rubber is 100% by mass. This resin composition-can be prepared by the method (3) in the methods for preparing the hydroxyl group-containing polypropylene resin composition (A) described above.

Next, the paint composition for in-mold coating (B) used in the present invention is described.

Paint Composition for In-mold Coating (B)

The paint composition for in-mold coating (B) used in the present invention comprises a vehicle component (a) comprising an oligomer containing at least two (meth)acrylate groups and an ethylenically unsaturated monomer capable of copolymerizing with the oligomer, a (meth)acryl modified chlorinated polyolefin (b), an organic peroxide polymerization initiator (c) and a polyisocyanate compound (d).

Vehicle Component (a)

Examples of the oligomer of the vehicle component (a) used in the present invention, the oligomer containing at least two (meth)acrylate groups, include oligomers of urethane (meth)acrylate, polyester(meth)acrylate, epoxy(meth)acrylate, polyether(meth)acrylate and silicon(meth)acrylate. These oligomers have an appropriate weight average molecular weight (Mw), which varies according to the kind thereof, of usually from 500 to 5000, preferably 1000 to 3000.

The oligomer containing (meth)acrylate groups suitably has at least two (meth)acrylate groups, preferably 2 to 4 (meth)acrylate groups in one molecule.

The urethane(meth)acrylate oligomer can be prepared by, for example, mixing (i) an organic di-isocyanate compound, (ii) an organic polyol compound and (iii) a hydroxyl alkyl (meth)acrylate in a NCO/OH ratio of from 0.8 to 1.0, preferably 0.9 to 1.0 with a general method. When hydroxyl groups are present in excess or hydroxyalkyl(meth)acrylate is used in a large amount, oligomers having a large amount of hydroxyl groups can be prepared.

Specifically, (i) the organic di-isocyanate compound is allowed to react with (ii) the organic polyol compound and the like in the presence of an urethanization catalyst such as dibutyl tin dilaurate or the like, to prepare a polyurethane prepolymer having terminal isocyanate. Next, the resulting prepolymer is allowed to react with (iii) the hydroxyalkyl (meth)acrylate until most of liberated isocyanate groups are reacted, to prepare the above urethane(meth)acrylate oligomer. The proportion of (ii) the organic polyol compound to (iii) the hydroxyalkyl(meth)arylate is preferably, for example, about from 0.2 to 0.5 mole based on 1 mole of the component (iii).

Examples of (i) the organic di-isocyanate compound may include 1,2-di-isocyanatoethane, 1,2-di-isocyanatopropane, 1,3-di-isocyanatopropane, hexamethylene di-isocyanate, lysine di-isocyanate, trimethyl hexamethylene di-isocyanate, tetramethylene di-isocyanate, bis(4-isocyanate cyclohexyl) methane, methylcyclohexane-2,4-di-isocyanate, methylcyclohexane-2,6-di-isocyanate, 1,3-bis(isocyanate methyl)cyclohexane, 1,3-bis(isocyanate ethyl)cyclohexane, 1,3-bis (isocyanate methyl)benzene and 1,3-bis(isocyanate-1-methylethyl)benzene. These (i) organic di-isocyanate compounds may be used singly or in combination of two or more.

As (ii) the organic polyol compound, an organic diol compound is preferred. Examples thereof may include alkyl diol, polyether diol and polyester diol.

Typical examples of the alkyl diol may include ethylene glycol, 1,3-propane diol, propylene glycol, 1,4-butane diol, 2,3-butane diol, 1,5-pentane diol, 1,6-hexane diol, 1,7-heptane diol, 1,8-octane diol, 1,9-nonane diol, and 1,4-cyclohexane diol.

The above polyether diol can be synthesized by polymerization of aldehyde, alkylene oxide or glycol with a known method.

For example, formaldehyde, ethylene oxide, propylene oxide or tetramethylene oxide is addition polymerized with alkyl diol in appropriate conditions to prepare the polyether diol.

As the polyesterdiol, it is possible to use, for example, an esterification reacted product obtainable by allowing an unsaturated dicarboxylic acid and/or acid anhydride thereof to react with excess of alkyl diol. It is further possible to use an esterification reacted product obtainable by polymerizing an alkyl diol with at least one compound selected from the group consisting of a hydroxycarboxylic acid, lactone, which is an intramolecular ester of hydroxycarboxylic acid, and lactide, which is an intermolecular ester of hydroxycarboxylic acid.

The organic polyol compounds (ii) listed above can be used singly or in combination of two or more.

Examples of the hydroxylalkyl(meth)acrylate (iii) may include 2-hydroxyethyl(meth)acrylate, 2-hydroxypropyl (meth)acrylate and 4-hydroxybutyl(meth)acrylate.

The polyester(meth)acrylate, which is the oligomer used in the present invention, can be prepared, for example, by reaction of a polyester polyol having a terminal hydroxyl group with an unsaturated carboxylic acid.

Such a polyester polyol can typically be prepared by esterification reaction of a saturated or unsaturated dicarboxylic acid or acid anhydride thereof with excess of alkylene diol.

Typical examples of the dicarboxylic acid may include oxalicacid, succinicacid, adipicacid, fumaricacid and maleic acid.

Typical examples of the alkylene diol may include ethylene glycol, propylene glycol, butane diol and pentane diol.

The epoxy(meth)acrylate oligomer, which is used as the oligomer in the present invention, is prepared, for example, by using an epoxy compound and unsaturated carboxylic acid in such amounts that the equivalent of carboxyl group is from 0.5 to 1.5 per 1 equivalent of epoxy group with usual ring-opening addition reaction of acid to epoxy group.

Examples of the epoxy compound may include bisphenol A type epoxy and phenolic novolac-type epoxy.

Typical examples of the unsaturated carboxylic acid may include acrylic acid and methacrylic acid.

Examples of polyether(meth)acrylate, which is as the oligomer used in the present invention, can be prepared by reaction of a polyether polyol such as polyethylene glycol and polypropylene glycol with the above described unsaturated carboxylic acid.

The silicon(meth)acrylate oligomer, which is used as the oligomer in the present invention, is prepared by, for example, esterification reaction of a hydroxyl group of an alcohol siloxane compound with an (meth)acrylic acid. The silicon(meth) acrylate oligomer particularly has excellent mold release properties and slip properties.

Examples of the ethylenically unsaturated monomer copolymerizable with the oligomer having (meth)acrylate group may include styrene, vinyl toluene, methyl(meth)acrylate, 2-ethylhexyl(meth)acrylate, cyclohexyl(meth)acrylate, tetrahydrofurfuryl(meth)acrylate, 2-hydroxyethyl(meth)acrylate, 2-hydroxypropyl(meth)acrylate, N-vinyl-2-pyrolidone, ethylene glycol di(meth)acrylate, tripropyleneglycol di(meth)acrylate, 1,6-hexanediol di(meth)acrylate and trimethylolpropane tri(meth)acrylate.

These ethylenically unsaturated monomers may be used singly or in combination of two or more.

The oligomer having at least two (meth)acrylate groups and the ethylenically unsaturated monomer copolymerizable with the oligomer are appropriately used in a mass ratio of oligomer to monomer of from 10/90 to 70/30, preferably 20/80 to 60/40. The mass ratio of less than 10/90 is unfavorable, because the viscosity of the paint composition for in-mold coating (B) becomes too low or bubbles are incorporated in the paint composition for in-mold coating (B) when flowing in the mold. On the other hand, the mass ratio of higher than 70/30 is also unfavorable, because the viscosity of the paint composition for in-mold coating (B) becomes too high and the fluidity in the mold becomes worse.

(Meth)acrylate-Modified Chlorinated Polyolefin (b)

The (meth)acryl modified chlorinated polyolefin (b) used in the present invention is obtained by, for example, graft polymerizing a (meth)acryl monomer with a chlorinated polyolefin in the presence of a peroxide.

Examples of the (meth)acryl monomer may include (meth) acrylic acid, methyl(meth)acrylate, ethyl(meth)acrylate, n-butyl(meth)acrylate and 2-ethylhexyl(meth)acrylate.

The (meth)acryl modified chlorinated polyolefin (b) may be a hydroxyl group-containing (meth)acryl modified chlorinated polyolefin obtainable by graft polymerizing a hydroxyl group-containing (meth)acryl monomer with a chlorinated polyolefin in the presence of a peroxide.

Examples of the hydroxyl group-containing (meth)acryl monomer used herein may include 2-hydroxyethyl(meth) acrylate 2-hydroxypropyl(meth)acrylate and 2-hydroxybutyl (meth)acrylate.

The (meth)acryl modified chlorinated polyolefin (b) may be used singly or in combination of two or more.

The (meth)acryl modified chlorinated polyolefin (b) used in the present invention has a chlorine content of from 2 to 40% by mass, preferably 2 to 30% by mass, more preferably 3 to 20% by mass. When the chlorine content is not less than 2% by mass, the paint composition for in-mold coating (B) having good storage stability is prepared without lowering the compatibility with the vehicle component (a) and then a smooth coating is prepared. On the other hand, when the chlorine content is not more than 40% by mass, good adhesion with a resin molded product of the resin composition (A) is obtained.

The (meth)acryl modified chlorinated polyolefin (b) may be suitably used in an amount of from 5 to 35 parts by mass, preferably 7 to 30 parts by mass, more preferably 7 to 20 parts by mass based on 100 parts by mass of the vehicle component (a) When the amount of the (meth)acryl modified chlorinated polyolefin (b) used is not less than 5 parts by mass, the good adhesion with a molded article can be obtained. Meanwhile, the amount is preferably not more than 35 parts by mass because a uniform coating is obtained without increasing the viscosity of the paint composition for in-mold coating (B) nor lowering the in-mold fluidity.

Organic Peroxide Polymerization Initiator (c)

The organic peroxide polymerization initiator (c) used in the present invention generates free radicals, and acts in such a way that the paint composition for coating (B) covers the surface of a resin molded product in the mold, the organic peroxide polymerization initiator (c) is thermally decomposed by heat of the mold surface or the molding resin to generate active radicals and thereby the paint composition for coating (B) is cured by radical polymerization reaction.

The organic peroxide desirably has a high decomposing rate from the standpoint of molding cycle, but the organic peroxide having a high decomposing rate has inferior stability.

The organic peroxide polymerization initiator (c) is preferably an organic peroxide having a 1 min half-life temperature of not higher than 150° C. Typical examples of the organic peroxide may include lauroyl peroxide, benzoyl peroxide, t-amylperoxy-2-ethyl hexanoate, t-butyl peroxy-2-ethyl hexanoate, bis (4-t-butylcyclohexyl)peroxycarbonate and t-hexylperoxy-2-ethylhexanoate. Here, the 1 min half-life temperature is a temperature at which the concentration of the organic peroxide is decreased to one-half of the initial concentration by 1 min.

The organic peroxide polymerization initiator (c) is appropriately used in an amount of from 0.5 to 5 parts by mass, preferably 0.7 to 4 parts by mass, more preferably 1 to 3 parts by mass based on 100 parts by mass of the vehicle component (a). When the amount of the organic peroxide polymerization initiator (c) used is not less than 0.5 part by mass, curing reaction proceeds sufficiently without requiring a long time. On the other hand, when the amount of the organic peroxide polymerization initiator (c) used is not more than 5 parts by mass, good adhesion with a resin molded product of the resin composition (A) can be attained without rapid reaction being started inside the mold.

Polyisocyanate Compound (d)

The polyisocyanate compound (d) used in the present invention is not particularly limited as long as it is a polyisocyanate compound conventionally used for paint applications, and examples thereof may include various kinds of polyisocyanates such as aromatic polyisocyanates, aliphatic polyisocyanates and alicyclic polyisocyanates. Preferable examples of the polyisocyanates are aromatic polyisocyanates such as toluene di-isocyanate (TDI) and 4,4'-diphenyl methane di-isocyanate (MDI) and xylene di-isocyanate (XDI); aliphatic polyisocyanates such as hexamethylene di-isocyanate (HMDI), lysine di-isocyanate (LDI) and 2-isocyanate ethyl-2,6-di-isocyanate caproate (LTI); and alicyclic polyisocyanates such as isophorone di-isocyanate (IPDI) and hydrogenated xylene di-isocyanate (H6XDI). These polyisocyanate compounds (d) can be used singly or in combination of two or more.

Furthermore, these polyisocyanates may be used in a prepolymer state such as buret form, adductor form or isocyanurate form. From the standpoint of weathering resistance, it is preferred to use aliphatic polyisocyanates.

The amount of the polyisocyanate compound (d) used is from 2 to 20 parts by mass, preferably 2 to 15 parts by mass, more preferably 2.5 to 10 parts by mass based on 100 parts by mass of the vehicle component (a). When the amount of the polyisocyanate compound (d) used is not less than 2 parts by mass, good adhesion with a resin molded product of the resin composition (A) is obtained. On the other hand, when the amount thereof is not more than 20 parts by mass, molded articles having good appearance and no loss of gloss can be prepared.

Other Components

To the paint composition (B) used in the present invention, further, a mold release agent may be blended in accordance with necessity without missing the object of the present invention.

Examples of the mold release agent may include stearic acid, zinc stearate, soybean lecithin, silicon oil, aliphatic acid ester and aliphatic acid alcohol dibasic acid esters.

The amount of the mold release agent used is preferably from 0.1 to 3 parts by mass based on 100 parts by mass of the vehicle component (a). The mold release effect can be exhibited by the use of the mold release agent in the above amount.

Furthermore, to the paint composition (B) used in the present invention, various kinds of color pigments and extenders usually used for plastics or paints may be blended in accordance with necessity without missing the object of the present invention.

Examples of the color pigments include titanium dioxide, titanium yellow, Hansa yellow, molybdate orange, benzidine orange, quinacridone red, phthalocyanine green, cobalt blue, ultramarine blue, carbon black and iron oxide. Further, the color pigments may be powdery or flaky iron oxide, nickel, aluminum or graphite, or may be scaly pigments such as mica treated with titanium oxide or the like.

Examples of the extenders may include calcium carbonate, talc, barium sulfate, aluminum hydroxide and clay.

To the paint composition (B) used in the present invention, moreover, various additives such as an antioxidant, ultraviolet absorber, curing accelerator, pigment disperser or antifoaming agent may be mixed without missing the object of the present invention.

Next, the process for preparing the in-mold coating molded article according to the present invention is described with reference to FIG. 1.

FIG. 1 is an illustrative view showing the whole structure of an in-mold coating (molding) apparatus (hereinafter referred to as "IMC apparatus") used in the process for preparing the in-mold coating molded article according to the present invention.

This IMC apparatus 100 makes use of a toggle type injection-molding machine and, roughly speaking, it is composed of a mold clamping apparatus 10, an injection apparatus 20, a control apparatus 30 and a mold apparatus 50.

The mold clamping apparatus 10 is equipped with a stationary platen 11 and a moving platen 12, which are for fixing a mold apparatus 50. And the mold clamping apparatus 10 has a structure such that the moving platen 12, which is capable of being carried forward and backward by a hydraulic cylinder for driving mold clamping (hereinafter referred to as "mold clamping cylinder") 13 with being guided by a tie rod 14, moves forward or backward to the stationary platen 11 and thereby the mold apparatus 50 is closed-or opened.

As described in JP-A-2001-38783, it is effective to use an injection molding machine having a toggle type mold clamping mechanism for carrying out the molding with in-mold coating due to the following reasons. That is, the injection molding machine has toggle power properties such that when a movable mold 52 and a stationary mold 51 open widely, a long stroke can be obtained with driving the mold clamping cylinder 13 by a relatively low hydraulic loading, while just before the mold closes, the mold moves slightly even if a long stroke of the mold clamping cylinder is applied. Therefore, the injection molding machine not only can move the mold rapidly but also can slightly open the mold with accuracy. Further, in the toggle type mold clamping mechanism, since the mold clamping cylinder 13 acts as both of an actuator capable of opening and closing the mold and an actuator capable of causing a mold clamping force, a shift of from a mold opening state to a prescribed mold clamping state can be quickly carried out. This quick action is effective in mold re-clamping after the paint has been injected.

The injection apparatus 20 is provided with a screw 21 having a spiral flight so that the screw 21 is rotated by a hydraulic motor 23 along the inner circumference surface of a cylindrical barrel 22 and can be freely moved forward and backward. The injection apparatus has a structure such that a resin pellet fed into a hopper 25 with rotation of the screw 21 is transported to front of the screw 21 and during the transportation the resin pellet is molten by heating with a heater (not shown) equipped on the outer circumference surface of the barrel 22 and by kneading operation with rotation of the screw 21.

When the amount of the molten resin transported to front of the screw 21 reaches to the prescribed amount, the rotation movement of the hydraulic motor 23 is stopped and also the screw 21 is moved forward by driving the injection cylinder 24 and thereby the molten resin stored in front of the screw 21 is injected into a mold cavity 53 of the mold apparatus 50 through a nozzle 26.

The mold apparatus 50 is equipped with the stationary mold 51 for fixing on the stationary platen 11 and the movable mold 52 for fixing on the moving platen 12, and on the movable mold 52, a injector for coating agent (paint) 55 is provided for injecting the coating agent into the mold cavity 53.

Next, the structure of a control apparatus 30 is described. As shown in FIG. 1, the control apparatus 30 is equipped with a control part of molding apparatus 31 which part inclusively controls the whole system of the control apparatus 30 by connecting the movement of the mold clamping apparatus 10 and the movement of the injection apparatus 20, and a part for controlling injection 38 which part controls the movement of the injection apparatus 20. Both of the control parts 31 and 38 have the same controlling capabilities as those of control parts of conventional injection molding machines.

As the control parts having control functions inherent in the IMC apparatus 100 of the present invention, the following parts are provided:

a part for controlling paint injector 35 which controls the movement of the injector for coating agent (paint) 55 by receiving a molding condition data signal (it represents variable patterns of molding conditions.) from a part for setting mold clamping conditions 32;

a part for controlling mold clamping 33 which controls a servo valve for mold clamping 15 with feeding back a measurement signal of a stroke sensor 16 by receiving molding condition data signals transmitted from the part for setting mold clamping conditions 32 and a part for storing variable patterns 34; and the part for storing variable patterns 34 which converts a mold opening clearance of the molds 51, 52 (hereinafter referred to as "mold opening clearance") and a mold clamping force of the molds 51, 52 (hereinafter referred to as "mold clamping force") transmitted from the part for setting mold clamping conditions 32 into molding condition data signals, and transmits the signals to the part for controlling mold clamping 33.

In the part for setting mold clamping conditions 32, following each molding condition is set: the opening and closing rates, movement timing, mold opening clearance and mold clamping force of the mold clamping apparatus 10, and the injection amount, injection rate, injection timing and injection pressure of the injector for coating agent (paint) 55. Then, the part for setting mold clamping conditions 32 transmits the molding condition data signals on the injection amount, injection rate, injection timing and injection pressure of the injector for coating agent (paint) 55 to the part for controlling paint injector 35, transmits the molding condition data signals on molding conditions relating to the opening and closing rates and movement timing of the mold clamping apparatus 10 to the part for controlling mold clamping 33, and transmits the molding condition data signals on molding conditions relating to the mold opening clearance and mold clamping force of the mold clamping apparatus 10 to the part for storing variable patterns 34.

In the part for storing variable patterns 34, the correlation between the stroke and mold opening clearance of the mold clamping cylinder 13, and the correlation between the stroke and mold clamping force of the mold clamping cylinder 13 are stored prior to the controlling. The part for storing variable patterns 34 converts the molding condition data signals transmitted from the part for setting mold clamping conditions 32 into the stroke of the mold clamping cylinder 13 based on the stored correlation and transmits them to the part for controlling mold clamping 33.

In the part for storing variable patterns 34, the correlation between the stroke and mold opening clearance of the mold clamping cylinder 13, and the correlation between the stroke and mold clamping force of the mold clamping cylinder 13 have to be stored prior to the controlling.

On this account, after the mold apparatus 50 is fixed on the stationary platen 11 and the moving platen 12, the die height regulation and the mold clamping force regulation are accomplished in accordance with the mold thickness (die height) of the mold apparatus 50 by the procedure same as general injection molding procedures. In the condition that these regulations have been accomplished, while the mold apparatus 50 is opened or closed, the detecting signals from the stroke sensor 16, the sensor for mold opening clearance 17 and the sensor for mold clamping force 18 are continuously received by the part for storing variable patterns 34 and thereby the correlation between the stroke and mold opening clearance of the mold clamping cylinder 13, and the correlation between the stroke and mold clamping force of the mold clamping cylinder 13 are calculated and stored.

Successively, the movement of the IMC apparatus 100 is described in carrying out molding with in-mold coating using the IMC apparatus 100 having the control apparatus 30 constituted as described above.

First, the first process for preparing the in-mold coating molded article according to the present invention is described with reference to FIG. 1

First Process for Preparing In-mold Coating Molded Article

While feedback control is carried out by the control signal transmitted from the part for controlling mold clamping 33 and the servo valve for mold clamping 15, the movable mold 52 is moved forward from the limit position for mold opening by the mold clamping cylinder 13 in accordance with the mold closing rate pattern set on the part for setting mold clamping conditions 32, and thereby is contacted with the stationary mold 51. Successively, while feedback control is carried out by the control signal transmitted from the part for controlling mold clamping 33 and the servo valve for mold clamping 15, the movable mold 52 is, further, moved forward by the mold clamping cylinder 13 in accordance with the molding condition data signals of mold clamping force (variable patterns of mold clamping force) set on the part for setting mold clamping conditions 32 to extend the tie rod 14 and thereby the prescribed mold clamping force is functioned on the mold apparatus 50. In this procedure, the movable mold 52 and the stationary mold 51 are kept at such an appropriate temperature that the temperature is lower than the melting point of the polypropylene resin (i) in the hydroxyl group containing polypropylene resin composition (A) and the paint composition for in-mold coating (B) is cured in the mold after the paint composition (B) is injected as a coating agent (paint).

The mold apparatus usable in the present invention needs to have a structure such that even when the mold slightly opens, the paint does not leak out from the parting plane of the mold during the after-mentioned injection of the coating agent (paint).

The mold apparatus 50 described herein is so made that the parting plane has a share edge structure. Accordingly, even if the mold is slightly opened, the paint does not leak out from the parting plane.

In the prescribed movement timing during the mold clamping apparatus 10 is operated, when the screw 21 is moved forward by the injection cylinder 24 with controlling the opening clearance of the servo valve for injection 27 by means of the control signal transmitted from the part for controlling injection, the molten resin (the resin composition (A)) stored in front of the screw 21 is injected into the mold cavity 53 through the nozzle 26 to form a resin molded product. The control part of molding apparatus 31 gives and receives the mutual movement timing signals of the mold clamping apparatus 10 and the injection apparatus 20 so that the movement of the apparatus 10 and the movement of the apparatus 20 interlock with each other.

The molten resin injected into the mold is kept with application of a hold pressure for a regular time in the same manner as general injection molding, and thereby an additional resin, the amount of the resin corresponds to the amount of the shrinkage of the solidified resin, is fed into the mold. After completion of the hold pressure application, the molten resin is solidified in such a condition that the mold clamping force is kept.

After the resin in the mold is solidified to a certain extent such that the surface thereof can withstand the injection pressure of the paint composition (B), the movable mold 52 is moved backward by the mold clamping cylinder 13 and an opening is provided between the surface of the resin molded product and the surface of the mold cavity 53 by giving the mold opening clearance set in the part for setting mold clamping conditions 32 while feedback controlling with the control signals transmitted from the part for controlling mold clamping 33 and the servo valve for mold clamping 15. Thereafter, the paint composition (B), which is a coating agent (paint), is injected into the mold cavity 53 by driving the injector for coating agent (paint) 55 with the control signals transmitted from the part for controlling paint injector 35 in accordance with the injection amount, injection rate, injection timing and injection pressure of the injector for coating agent (paint) 55 which are set in the part for setting mold clamping conditions 32.

Successively, while feedback control is carried out by the control signal transmitted from the part for controlling mold clamping 33 and the servo valve for mold clamping 15, the movable mold 52 is again moved forward by the mold clamping cylinder 13, and the mold clamping force, which is just same as the molding condition data of the mold clamping force set in the part for setting mold clamping conditions 32, is generated.

In this way, it is possible to spread the paint composition (B) thus injected on all the surface of the resin molded product and to give the optimum pressure conditions for the appearance and adhesion strength of the coating film.

As the mold temperature is kept at a temperature at which the curing of the paint composition (B) progresses, the paint composition (B) is cured in a condition of being kept with the mold clamping force set. In this curing, the paint composition (B) is cured in a condition of being pressed onto the mold surface, and thereby the mold surface shape is exactly transferred to the coating surface of the paint composition (B).

Thereafter, while feedback control is carried out by the control signal transmitted from the part for controlling mold clamping 33 and the servo valve for mold clamping 15, the movable mold 52 is moved backward to the prescribed mold opening position by the mold clamping cylinder 13 in accordance with the movement timing and the mold opening rate pattern set in the part for setting mold clamping conditions 32 and then a molded article coated with the paint composition (B) is taken out from the mold apparatus 50. Thus, one cycle is completed.

The curing temperature of the paint composition for in-mold coating (B) is preferably lower than the melting point of the polypropylene resin (i) in the hydroxyl group containing polypropylene resin composition (A), more preferably, at most, 20° C. lower than the melting point of the polypropylene resin (i) in the hydroxyl group containing polypropylene resin composition (A), furthermore preferably, at most, 30° C. lower than the melting point of the polypropylene resin (i) in the hydroxyl group containing polypropylene resin composition (A) When the resin composition (A) contains at least two kinds of polypropylene resin components, the above melting point of the polypropylene resin (i) is based on the melting point of the polypropylene resin component having the highest melting point.

An examples of the method of measuring the melting point of the polypropylene resin component may include a method in which the pellet of the polypropylene resin component is annealed at 230° C. for 10 min and thereafter using a differential scanning calorimeter (DSC) the temperature is decreased to 30° C. at a rate of 10° C./min and kept for 1 min, and then the temperature is elevated at a rate of 10° C./min and the temperature at which the calorimetric absorption is the maximum is determined and then the temperature is taken as the melting point (Tm).

In the molding, the mold temperature is preferably set in the range such that the hydroxyl group containing polypropylene resin composition (A) can be cooled to become capable of withstanding the flowing of the paint composition for in-mold coating (B) and also the paint composition for in-mold coating (B) can be cured, namely it is lower than the melting point of the polypropylene resin (i) of the hydroxyl group containing polypropylene resin composition (A), preferably, at most, 5° C. lower than the melting point, more preferably, at most, 10° C. lower than the melting point, and it is not less than the curing temperature of the paint composition for in-mold coating (B), preferably, at least, 5° C. higher than the curing temperature, more preferably, at least, 10° C. higher than the curing temperature.

The mold temperature described in the present invention means the set temperature of the mold. In the case that the set temperature of the mold is largely different from the temperature of the mold near the mold cavity part, of course, it is preferred to take into account this difference. Needless to say, in the present invention, the mold temperature near the mold cavity part is preferably in the above temperature range just before injecting the hydroxyl group containing polypropylene resin composition (A) into the mold.

Next, the second process for preparing the in-mold coating molded article is described with reference to FIG. 1.

Second Process for Preparing In-mold Coating Molded Article Method for Forming In-mold Coating Utilizing Injection Compression Molding Method While feedback control is carried out by the control signal sent from the part for controlling mold clamping 33 and the servo valve for mold clamping 15, the movable mold 52 is moved forward from the limit position for mold opening by the mold clamping cylinder 13 in accordance with the mold closing rate pattern set on the part for setting mold clamping conditions 32 to contact with the stationary mold 51. Successively, while feedback control is carried out by the control signal transmitted from the part for controlling mold clamping 33 and the servo valve for mold clamping 15, the movable mold 52 is, further, moved forward by the mold clamping cylinder 13 in accordance with the molding condition data signals of mold clamping force (variable patterns of mold clamping force) set in the part for setting mold clamping conditions 32 to extend the tie rod 14 and thereby the first mold clamping force is functioned on the mold apparatus 50. The first mold clamping force (sometimes referred to as primary mold clamping pressure) is set at such a mold clamping force that the parting plane of the mold apparatus 50 is slightly opened by the injection filling pressure of the resin composition (A) in the injection filling step taking account of the injection filling step of the resin composition (A) described later. In this procedure, the movable mold 52 and the stationary mold 51 are kept at such an appropriate temperature that the temperature is lower than the melting point of the polypropylene resin (i) in the hydroxyl group containing polypropylene resin composition (A) and the paint composition (B) is cured in the mold after the paint composition (B) is injected as a coating agent (paint).

The mold apparatus 50 described herein is so made that the parting plane has a share edge structure. Accordingly, even if the mold is slightly opened in filling the resin and injecting the coating agent (paint), the paint does not leak out from the parting plane.

In the prescribed movement timing during the mold clamping apparatus 10 is operated, when the screw 21 is moved forward by the injection cylinder 24 with controlling the opening clearance of the servo valve for injection 27 by means of the control signal transmitted from the part for controlling injection, the molten resin (the resin composition (A)) stored in front of the screw 21 is injected into the mold cavity 53 through the nozzle 26 to form a resin molded product. The control part of molding apparatus 31 gives and receives the mutual movement timing signals of the mold clamping apparatus 10 and the injection apparatus 20 so that the movement of the apparatus 10 and the movement of the apparatus 20 interlock with each other.

In the second preparation process utilizing the injection compression molding method, during the molten resin is injected into the mold or after injection of the molten resin is completed, the movable mold 52 is further moved forward by the mold clamping cylinder 13 in accordance with the molding condition data signals of mold clamping force (variable patterns of mold clamping force) set on the part for setting mold clamping conditions 32, while feedback control is carried out by the control signal transmitted from the part for controlling mold clamping 33 and the servo valve for mold clamping 15, and thereby the tie rod 14 is further extended so that the mold clamping force is increased to the second mold clamping force.

The use of the injection compression molding method has the advantages such that the residual stress remained in the resulting resin molded product is lower as compared with usual injection molding because the first mold clamping force is not sufficient to withstand the injection pressure and thus by reason of slight opening of the mold in the injection of the molten resin, the resin flowing pressure is lowered and the gas in the mold easily leaks out of the mold cavity 53. Furthermore, the second mold clamping force is applied during the injection or after completion of the injection, and thereby the surface conditions including sink or the like of the resulting resin molded product thus prepared are the same as the surface conditions of usual injection molded articles.

Thereafter, the molten resin is solidified with keeping the second mold clamping force.

After the resin in the mold is solidified to a certain extent such that the surface thereof can withstand the injection pressure of the paint composition (B), the movable mold 52 is moved backward by the mold clamping cylinder 13 and the space is provided between the surface of the resin molded product and the surface of the mold cavity 53 by giving the mold opening clearance set in the part for setting mold clamping conditions 32 while feedback control is carried out by the control signals transmitted from the part for controlling mold clamping 33 and the servo valve for mold clamping 15. Thereafter, the paint composition (B), which is a coating agent (paint), is injected into the mold cavity 53 by driving the injector for coating agent (paint) 55 with the control signals transmitted from the part for controlling paint injector 35 in accordance with the injection amount, injection rate, injection timing and injection pressure of the injector for coating agent (paint) 55 which are set in the part for setting mold clamping conditions 32.

Successively, while feedback control is carried out by the control signals transmitted from the part for controlling mold clamping 33 and the servo valve for mold clamping 15, the movable mold 52 is again moved forward by the mold clamping cylinder 13, and the mold clamping force, which is just same as the molding condition data of the mold clamping force set in the part for setting mold clamping conditions 32, is generated.

In this way, it is possible to spread the paint composition (B) thus injected on all the surface of the resin molded product and to give the optimum pressure conditions for the appearance and adhesion strength of the coating film.

As the mold temperature is kept at a temperature at which the curing of the paint composition (B) progresses, the paint composition (B) is cured in a condition of being kept by the mold clamping force set. In this curing, the paint composition (B) is cured in a condition of being pressed onto the mold surface, and thereby the mold surface shape is exactly transferred to the coating surface of the paint-composition (B).

Thereafter, while feedback control is carried out by the control signals transmitted from the part for controlling mold clamping 33 and the servo valve for mold clamping 15, the movable mold 52 is moved backward to the prescribed mold opening position by the mold clamping cylinder 13 in accordance with the movement timing and the mold opening rate pattern set in the part for setting mold clamping conditions 32 and then a molded article coated with the paint composition (B) is taken out from the mold apparatus 50. Thus, one cycle is completed.

As described above, the second preparation process utilizing the injection compression molding method has an effect that the resin molded product after molding is hard to be deformed because the residual stress remained in the resin molded product is minimized. When an in-mold coating molded article is deformed even if slightly after the molding, the surface appearance is affected largely. Therefore, the second preparation process is a preferable embodiment.

Lastly, the third process for preparing the in-mold coating molded article according to the present invention is described with reference to FIG. 1.

Third Process for Preparing In-mold Coating Molded Article Method for In-mold Coating Molding with Injection Press Molding Method While feedback control is carried out by the control signal transmitted from the part for controlling mold clamping 33 and the servo valve for mold clamping 15, the movable mold 52 is moved forward from the limit position for mold opening by the mold clamping cylinder 13 in accordance with the mold closing rate pattern set on the part for setting mold clamping conditions 32 and then stopped at the position that the space between the movable mold 52 and the stationary mold 51 is a predetermined distance. In this case, the movable mold 52 and the stationary mold 51 are kept at an appropriate temperature such that it is lower than the melting point of the polypropylene resin (i) in the hydroxyl group containing polypropylene resin composition (A) and the coating agent is cured in the mold after injecting the coating agent.

The mold apparatus 50 described herein is so made that the parting plane has a share edge structure. Accordingly, even if the mold is slightly opened in filling the resin or injecting the coating agent, the paint does not leak out from the parting plane.

In the prescribed movement timing during the mold clamping apparatus 10 is operated, when the screw 21 is moved forward by the injection cylinder 24 with controlling the opening clearance of the servo valve for injection 27 by means of the control signal transmitted from the part for controlling injection, the molten resin (the resin composition (A)) stored in front of the screw 21 is injected into the mold cavity 53 through the nozzle 26. The control part of molding apparatus 31 gives and receives the mutual movement timing signals of the mold clamping apparatus 10 and the injection apparatus 20 so that the movement of the apparatus 10 and the movement of the apparatus 20 interlock with each other.

In the third preparation process utilizing the injection press molding method, the molten resin is injected in such a condition that the stationary mold 51 and the movable mold 52 are kept in a prescribed distance without application of a mold clamping force. Then, during the molten resin is injected into the mold cavity or after injection of the molten resin is completed, the movable mold 52 is further moved forward by the mold clamping cylinder 13 in accordance with the molding condition data signals of mold clamping force (variable patterns of mold clamping force) set on the part for setting mold clamping conditions 32, while feedback control is carried out by the control signal transmitted from the part for controlling mold clamping 33 and the servo valve for mold clamping 15 and thereby the mold clamping force is increased to the prescribed mold clamping force.

The use of the injection press molding method has the advantages such that the residual stress remained in the resin molded product is much lower as compared with usual injection molding because the molten resin is injected in such a condition that the mold is opened with a prescribed opening and thus the resin flowing pressure is largely lowered. Furthermore, the prescribed mold clamping force is applied during the injection or after completion of the injection, and thereby the resin pressure generated at the end of the resin molded product can be made to be higher as compared with usual injection molding. Therefore, the thickness of the resin molded product can be formed to be more uniform as compared with usual injection molding.

After application of the prescribed mold clamping force, the molten resin is solidified with keeping the mold clamping force.

After the resin in the mold is solidified to a certain extent such that the surface thereof can withstand the injection pressure of the paint composition (B) which is a coating agent, the movable mold 52 is moved backward by the mold clamping cylinder 13 and the space is provided between the surface of the resin molded product and the surface of the mold cavity 53 by giving the mold opening clearance set in the part for setting mold clamping conditions 32 while feedback control is carried out by the control signals transmitted from the part for controlling mold clamping 33 and the servo valve for mold clamping 15. Thereafter, the paint composition (B) is injected into the mold cavity 53 by driving the injector for coating agent (paint) 55 with the control signals transmitted from the part for controlling paint injector 35 in accordance with the injection amount, injection rate, injection timing and injection pressure of the injector for coating agent (paint) 55 which are set in the part for setting mold clamping conditions 32.

Successively, while feedback control is carried out by the control signals transmitted from the part for controlling mold clamping 33 and the servo valve for mold clamping 15, the movable mold 52 is again moved forward by the mold clamping cylinder 13, and the mold clamping force, which is just same as the molding condition data of the mold clamping force set in the part for setting mold clamping conditions 32, is generated.

In this way, it is possible to spread the paint composition (B) thus injected on all the surface of the resin molded product and to give the optimum pressure conditions for the appearance and adhesion strength of the coating film.

As the mold temperature is kept at a temperature at which the curing of the paint composition (B) progresses, the paint composition (B) is cured in a condition of being kept with the mold clamping force set. In this curing, the paint composition (B) is cured in a condition of being pressed onto the mold surface, and thereby the mold surface shape is exactly transferred to the paint film surface of the paint composition (B).

Thereafter, while feedback control is carried out by the control signals transmitted from the part for controlling mold clamping 33 and the servo valve for mold clamping 15, the movable mold 52 is moved backward to the prescribed mold opening position by the mold clamping cylinder 13 in accordance with the movement timing and the mold opening rate pattern set in the part for setting mold clamping conditions 32 and then a molded article coated with the paint composition (B) is taken out from the mold apparatus 50. Thus, one cycle is completed.

As described above, the third preparation process utilizing the injection press molding method has excellent function effects that the residual stress remained in the resin molded product is minimized and the thickness of the resin molded product is formed to be more uniform as compared with usual injection molding.

Accordingly, the in-mold coating molded article prepared by the third preparation process is a favorable in-mold coating molded article in the respects that the deformation thereof is slight and the coating thickness is more uniform as compared with conventional ones.

EFFECT OF THE INVENTION

The present invention can provide an in-mold coating molded article such that a paint composition for in-mold coating is monolithically formed on the surface of a resin molded product of a polypropylene resin composition with good adhesion strength, and also provide a process for preparing the in-mold coating molded article.

The molded articles of the present invention can be used for car interior and exterior parts such as bumper, mole, door trim, instrument panel, trim, console box and the like, electrical appliance interior and exterior parts and building material interior and exterior members.

EXAMPLE

Hereinafter, the present invention is described with reference to the following examples, and it is not limited by these examples.

The polypropylene resin compositions used in the examples and the comparative examples are pelletized polypropylene resin compositions prepared by mixing the components described below in the proportions shown in Table 1, melt-mixing the mixture by means of a biaxially extruder in which the cylinder temperature is set to 200° C., followed by underwater cutting. The hydroxyl value and the rubber component content of each of the resulting compositions are shown in Table 1.

The polypropylene resin compositions (P-1) to (P-8) are the hydroxyl group containing polypropylene resin compositions (A) according to the present invention, but the polypropylene resin compositions (Q-1) to (Q-3) are not the resin compositions (A) used in the present invention.

Components Shown in Table 1

(1) Propylene block copolymer
   MFR (ASTM D 1238, 230° C., load 2.16 Kg)=23 g/10 min, Ethylene.propylene copolymer content=11% by mass Ethylene content of ethylene.propylene copolymer=46% by mole.
(2) Hydroxyl group containing propylene homopolymer obtained by modifying a propylene homopolymer with hydroxymethyl methacrylate with a melt modification method
   MFR (ASTM D 1238, 230° C., load 2.16 Kg)=100 g/10 min, Hydroxyl value=15 (KOH mg/g)
(3) Hydroxyl group containing rubber
   Trade Name: Polytail H manufactured by Mitsubishi Chemicals Corporation Hydroxyl value=45 (KOH mg/g)
(4) Hydroxyl group containing low molecular weight polypropylene
   Trade Name: Umex 1210 manufactured by Sanyo Chemical Industries Corporation Hydroxyl value=54 (KOH mg/g)
(5) Ethylene.1-butene copolymer
   Mooney viscosity $ML_{1+4}$(100° C.)=16 Ethylene concentration=82% by mole
(6) Linear low density polyethylene
   Trade Name: Evolue SP0540 manufactured by Mitsui Sumitomo Polyolefin Co.
   MFR (ASTM D 1238, 190° C., load 2.16 Kg)=4.0 g/10 min, Density=0.905 g/cm$^3$
(7) Talc
   Average particle diameter=2 μm
(8) Phenol heat resistant stabilizer
   Trade Name: Irganox 1010 manufactured by Ciba Specialty Chemicals Inc.
(9) Phosphorus heat resistant stabilizer
   Trade Name: Irgafos 168 manufactured by Ciba Specialty Chemicals Inc.

TABLE 1

| Polypropylene resin composition | 1 mass % | 2 mass % | 3 mass % | 4 mass % | 5 mass % | 6 mass % | 7 mass % | 8 phr | 9 phr | Hydroxyl value KOH mg/g | Rubber component amount mass %* |
|---|---|---|---|---|---|---|---|---|---|---|---|
| P-1 | 50 | 33 | 0 | 0 | 17 | 0 | 10 | 0.05 | 0.05 | 5.0 | 22.5 |
| P-2 | 45 | 38 | 0 | 0 | 17 | 0 | 20 | 0.05 | 0.05 | 5.7 | 22.0 |
| P-3 | 40 | 33 | 0 | 0 | 27 | 0 | 10 | 0.05 | 0.05 | 5.0 | 31.4 |
| P-4 | 35 | 38 | 0 | 0 | 27 | 0 | 20 | 0.05 | 0.05 | 5.7 | 30.9 |
| P-5 | 68 | 0 | 10 | 0 | 22 | 0 | 10 | 0.05 | 0.05 | 4.5 | 39.5 |
| P-6 | 63 | 0 | 0 | 10 | 27 | 0 | 10 | 0.05 | 0.05 | 5.4 | 33.9 |
| P-7 | 37 | 33 | 0 | 0 | 20 | 10 | 10 | 0.05 | 0.05 | 5.0 | 24.1 |
| P-8 | 16 | 33 | 0 | 0 | 21 | 30 | 10 | 0.05 | 0.05 | 5.0 | 22.8 |
| Q-1 | 100 | 0 | 0 | 0 | 0 | 0 | 10 | 0.05 | 0.05 | 0.0 | 11.0 |
| Q-2 | 83 | 0 | 0 | 0 | 17 | 0 | 10 | 0.05 | 0.05 | 0.0 | 26.1 |
| Q-3 | 67 | 33 | 0 | 0 | 0 | 0 | 10 | 0.05 | 0.05 | 5.0 | 7.4 |

*: The rubber component amount is the total amount of the amount of the added ethylene 1-butene copolymer and the amount of the component soluble in n-decane at 23° C. of the resin composition excluding the ethylene.1-butene copolymer, talc, the phenol heat resistant stabilizer and phosphorus heat resistant stabilizer, based on 100% by mass of the amount of the resin composition excluding talc, the phenol heat resistant stabilizer and phosphorus heat resistant stabilizer.

*: The hydroxyl value is a hydroxyl value based on the amount of the resin composition excluding talc, the phenol heat resistant stabilizer and phosphorus heat resistant stabilizer (thermoplastic components).

Regarding the paint composition for in-mold coating used in the examples and comparative examples, the following components excluding the organic peroxide and the polyisocyanate compound were mixed and dispersed in the proportion as shown in Table 2 by a three-roll mill to prepare a paint chief ingredient. Next, to the paint chief ingredient, the following organic peroxide and the polyisocyanate compound were added in the proportion as shown in Table 2, and sufficiently mixed to prepare the paint composition for in-mold coating.

The paint composition (A-1) to (A-8) as shown in Table 2 are the paint compositions for in-mold coating (B), but the paint compositions (B-1) to (B-8) are not the paint compositions (B) used in the present invention.

Components Shown in Table 2

(1) (Meth)acrylate Group Containing Oligomer

1) UAC-1

1000 Parts by mass of polycaprolactam diol (molecular weight 500), 840 parts by mass of isophorone di-isocyanate, 1.0 part by mass of hydroquinone monomethylether and 1.8 parts by mass of dibutyl tin laurate were fed into a reactor and reacted with stirring at 75° C. for 3 hr, and then 228 parts by mass of hydroxyethyl acrylate and 0.5 part by mass of hydroquinone monomethylether were added and reacted at 75° C. for 4 hr to prepare an urethane acrylate oligomer (UAC-1) having two acrylate groups and a weight average molecular weight (Mw) of 3000.

2) Ebecryl EB350 (Trade Name) Silicon diacrylate oligomer having two acrylate groups (manufactured by Daicel•UCB Co. Ltd.

(2) Ethylenically Unsaturated Monomer 1) 1,6-Hexane diol diacrylate

2) Polypropylene glycol diacrylate (3) (Meth)acryl Modified Chlorinated Polyolefin

1) PP-1

PP-1 was obtained by removing solvents from Super Chlon 223 M (Trade Name: manufactured by Nippon Paper Industries Co., Ltd.) (chlorine content 5% by mass)

2) PP-2

PP-2 was obtained by removing solvents from Super Chlon 224 H (Trade Name: manufactured by Nippon Paper Industries Co., Ltd.) (chlorine content 12.8% by mass)

3) PP-3

PP-3 was obtained by removing solvents from Hardlen KH-4021 (Trade Name: manufactured by Toyo Kasei Industries Co., Ltd.) (chlorine content 17% by mass)

(4) Organic Peroxide

1) Bis(4-t-butylcyclohexyl)peroxy dicarbonate 2) t-Amylperoxy-2-ethyl hexanoate (5) Polyisocyanate Compound 1) 2-Isocyanate ethyl-2,6-diisocyanate caproate 2) Tris(6-isocyanate hexyl)isocyanurate (6) Color Pigment Cinquacia red Y RT-759-D (Trade Name): quinacridone organic pigment manufactured by Ciba Geigy Co., Ltd.

(7) Mold Release Agent

1) Zinc stearate

2) ZELEC-NE (Trade Name)
Neutralization phosphate alcohol (Du Pont Co., Ltd.)

(8) Curing Accelerator

8% cobalt octoate

TABLE 2-1

| Composition [part by mass] | Paint composition | | | |
|---|---|---|---|---|
| | A-1 | A-2 | A-3 | A-4 |
| UAC-1 | 50.0 | 50.0 | 50.0 | 50.0 |
| Ebecryl EB350 | 0.5 | 0.5 | 0.5 | 0.5 |
| 1,6-hexane dioldiacrylate | 30.0 | 30.0 | 30.0 | 30.0 |
| polypropylene glycol diacrylate | 20.0 | 20.0 | 20.0 | 20.0 |
| PP-1 | 18.0 | 0 | 0 | 20.0 |
| PP-2 | 0 | 18.0 | 0 | 5.0 |
| PP-3 | 0 | 0 | 18.0 | 0 |
| bis(4-t-butylcyclohexyl)peroxy dicarbonate | 1.5 | 1.5 | 1.5 | 2.0 |
| t-amylperoxy-2-ethylhexanoate | 0 | 0 | 0 | 0 |
| 2-isocyanate ethyl-2,6-diisocyanate caproate | 7.0 | 7.0 | 7.0 | 7.0 |
| tris(6-isocyanatehexyl)-isocyanurate | 0 | 0 | 0 | 0 |
| Cinquacia red Y RT-759-D (colorant) | 13.0 | 13.0 | 13.0 | 13.0 |
| zinc strearate (mold release agent) | 1.0 | 1.0 | 1.0 | 1.0 |
| ZELEC-NE (mold release agent) | 0.4 | 0.4 | 0.4 | 0.4 |
| 8% cobalt octoate (curing accelerator) | 0.2 | 0.2 | 0.2 | 0.2 |
| Amount of oligomer constituting vehicle component [part by mass] | 50.5 | 50.5 | 50.5 | 50.5 |
| Amount of ethylenically unsaturated monomer constituting vehicle component [part by mass] | 50.0 | 50.0 | 50.0 | 50.0 |
| Amount of (meth)acryl-modified chlorinated polyolefin [part by mass] | 18.0 | 18.0 | 18.0 | 25.0 |
| Amount of organic peroxide [part by mass] | 1.5 | 1.5 | 1.5 | 2.0 |
| Amount of polyisocyanate compound [part by mass] | 7.0 | 7.0 | 7.0 | 7.0 |
| Amount of each component based on 100 parts by mass of vehicle component [part by mass] | | | | |
| (Meth)acrylmodified chlorinated polyolefin | 17.9 | 17.9 | 17.9 | 24.9 |
| Organic peroxide | 1.5 | 1.5 | 1.5 | 2.0 |
| Polyisocyanate compound | 7.0 | 7.0 | 7.0 | 7.0 |

TABLE 2-2

| Composition [part by mass] | Paint composition | | | |
|---|---|---|---|---|
| | A-5 | A-6 | A-7 | A-8 |
| UAC-1 | 50.0 | 30.0 | 35.0 | 50.0 |
| Ebecryl EB350 | 0.5 | 0 | 0.5 | 0.5 |
| 1,6-hexane dioldiacrylate | 30.0 | 40.0 | 35.0 | 30.0 |
| polypropylene glycol diacrylate | 20.0 | 30.0 | 30.0 | 20.0 |
| PP-1 | 18.0 | 18.0 | 0 | 0 |
| PP-2 | 0 | 0 | 30.0 | 18.0 |
| PP-3 | 0 | 0 | 0 | 0 |
| bis(4-t-butylcyclohexyl)peroxy dicarbonate | 1.5 | 1.5 | 2.0 | 1.0 |
| t-amylperoxy-2-ethylhexanoate | 0 | 0 | 0 | 3.0 |
| 2-isocyanate ethyl-2,6-diisocyanate caproate | 0 | 7.0 | 2.0 | 7.0 |
| tris(6-isocyanatehexyl)-isocyanurate | 15.0 | 0 | 0 | 0 |
| Cinquacia red Y RT-759-D (colorant) | 13.0 | 13.0 | 13.0 | 13.0 |
| zinc strearate (mold release agent) | 1.0 | 1.0 | 1.0 | 1.0 |
| ZELEC-NE (mold release agent) | 0.4 | 0.4 | 0.4 | 0.4 |
| 8% cobalt octoate (curing accelerator) | 0.2 | 0.2 | 0.2 | 0.2 |

TABLE 2-2-continued

| Composition [part by mass] | Paint composition | | | |
|---|---|---|---|---|
| | A-5 | A-6 | A-7 | A-8 |
| Amount of oligomer constituting vehicle component [part by mass] | 50.5 | 30.0 | 35.5 | 50.5 |
| Amount of ethylenically unsaturated monomer constituting vehicle component [part by mass] | 50.0 | 70.0 | 65.0 | 50.0 |
| Amount of (meth)acryl-modified chlorinated polyolefin [part by mass] | 18.0 | 18.0 | 30.0 | 18.0 |
| Amount of organic peroxide [part by mass] | 1.5 | 1.5 | 2.0 | 4.0 |
| Amount of polyisocyanate compound [part by mass] | 15.0 | 7.0 | 2.5 | 7.0 |
| Amount of each component based on 100 parts by mass of vehicle component [part by mass] | | | | |
| (Meth)acrylmodified chlorinated polyolefin | 17.9 | 18.0 | 29.9 | 17.9 |
| Organic peroxide | 1.5 | 1.5 | 2.0 | 4.0 |
| Polyisocyanate compound | 14.9 | 7.0 | 2.5 | 7.0 |

TABLE 2-3

| Composition [part by mass] | Paint composition | | | |
|---|---|---|---|---|
| | B-1 | B-2 | B-3 | B-4 |
| UAC-1 | 50.0 | 4.5 | 80.0 | 50.0 |
| Ebecryl EB350 | 0.5 | 0.5 | 0.5 | 0.5 |
| 1,6-hexane dioldiacrylate | 30.0 | 60.0 | 0 | 30.0 |
| polypropylene glycol diacrylate | 20.0 | 35.0 | 20.0 | 20.0 |
| PP-1 | 3.0 | 18.0 | 18.0 | 40.0 |
| bis(4-t-butylcyclohexyl)peroxy dicarbonate | 1.5 | 1.5 | 1.5 | 2.0 |
| 2-isocyanate ethyl-2,6-diisocyanate caproate | 7.0 | 7.0 | 7.0 | 7.0 |
| Cinquacia red Y RT-759-D (colorant) | 13.0 | 13.0 | 13.0 | 13.0 |
| zinc strearate (mold release agent) | 1.0 | 1.0 | 1.0 | 1.0 |
| ZELEC-NE (mold release agent) | 0.4 | 0.4 | 0.4 | 0.4 |
| 8% cobalt octoate (curing accelerator) | 0.2 | 0.2 | 0.2 | 0.2 |
| Amount of oligomer constituting vehicle component [part by mass] | 50.5 | 5.0 | 80.5 | 50.5 |
| Amount of ethylenically unsaturated monomer constituting vehicle component [part by mass] | 50.0 | 95.0 | 20.0 | 50.0 |
| Amount of (meth)acryl-modified chlorinated polyolefin [part by mass] | 3.0 | 18.0 | 18.0 | 40.0 |
| Amount of organic peroxide [part by mass] | 1.5 | 1.5 | 1.5 | 2.0 |
| Amount of polyisocyanate compound [part by mass] | 7.0 | 7.0 | 7.0 | 7.0 |
| Amount of each component based on 100 parts by mass of vehicle component [part by mass] | | | | |
| (Meth)acrylmodified chlorinated polyolefin | 3.0 | 18.0 | 17.9 | 39.8 |
| Organic peroxide | 1.5 | 1.5 | 1.5 | 2.0 |
| Polyisocyanate compound | 7.0 | 7.0 | 7.0 | 7.0 |

TABLE 2-4

| Composition [part by mass] | Paint composition | | | |
|---|---|---|---|---|
| | B-5 | B-6 | B-7 | B-8 |
| UAC-1 | 50.0 | 50.0 | 50.0 | 50.0 |
| Ebecryl EB350 | 0.5 | 0.5 | 0.5 | 0.5 |
| 1,6-hexane dioldiacrylate | 30.0 | 30.0 | 30.0 | 30.0 |
| polypropylene glycol diacrylate | 20.0 | 20.0 | 20.0 | 20.0 |
| PP-1 | 18.0 | 18.0 | 18.0 | 18.0 |
| bis(4-t-butylcyclohexyl)peroxy dicarbonate | 1.5 | 1.5 | 0.3 | 10.0 |
| 2-isocyanate ethyl-2,6-diisocyanate caproate | 0 | 25.0 | 7.0 | 7.0 |
| Cinquacia red Y RT-759-D (colorant) | 13.0 | 13.0 | 13.0 | 13.0 |
| zinc strearate (mold release agent) | 1.0 | 1.0 | 1.0 | 1.0 |
| ZELEC-NE (mold release agent) | 0.4 | 0.4 | 0.4 | 0.4 |
| 8% cobalt octoate (curing accelerator) | 0.2 | 0.2 | 0.2 | 0.2 |
| Amount of oligomer constituting vehicle component [part by mass] | 50.5 | 50.5 | 50.5 | 50.5 |
| Amount of ethylenically unsaturated monomer constituting vehicle component [part by mass] | 50.0 | 50.0 | 50.0 | 50.0 |
| Amount of (meth)acryl-modified chlorinated polyolefin [part by mass] | 18.0 | 18.0 | 18.0 | 18.0 |
| Amount of organic peroxide [part by mass] | 1.5 | 1.5 | 0.3 | 10.0 |
| Amount of polyisocyanate compound [part by mass] | 0 | 25.0 | 7.0 | 7.0 |
| Amount of each component based on 100 parts by mass of vehicle component [part by mass] | | | | |
| (meth)acrylmodified chlorinated polyolefin | 17.9 | 17.9 | 17.9 | 17.9 |
| Organic peroxide | 1.5 | 1.5 | 0.3 | 10.0 |
| Polyisocyanate compound | 0 | 24.9 | 7.0 | 7.0 |

Examples 1 to 22 and Comparative Examples 1 to 11

A box-like mold for in-mold coating molding (projection area: about 400 cm$^2$) was installed in a toggle type injection molding machine for in-mold coating molding having a mold clamping force of 350 tf equipped with a coating agent (paint) injecting apparatus. The mold was clamped by application of a mold clamping force of 200 tf and in this state, into a mold cavity, a polypropylene resin composition heated at 180° C. was filled at an injection rate of 100 cc/sec and then the hold pressure of 40 MPa was applied thereon for 5 sec. In this time, using circulating water of a pressurized water type mold temperature controller, the mold temperature was set to 100° C. at which the paint curing is caused. The polypropylene resin composition filled in the cavity was cooled for 90 sec in the mold in a condition such that the mold clamping force was applied, and was solidified to an extent that the surface can withstand the flowing of the coating agent.

Next, the mold was opened with an opening of 0.2 mm and a paint composition was filled between the resin molded product surface and the mold cavity surface with a pressure of 15 MPa from the paint injection apparatus equipped on the mold, and the mold was closed again and kept for 120 sec with application of a mold clamping force of 10 tf and thereby the paint composition was cured. Thereafter, the mold was opened and then the molded article was taken out.

With regard to the resulting coating coated on the surface of the molded article taken out, the cured condition, the bubble inclusion and the coating defectiveness were observed visually and thereby the condition of the coating was evaluated. The results are shown in Table 3.

With regard to the molded article prepared just after the molding, the occurrence of coating blisters and coating peeling and the surface gloss of the coating were observed visually and thereby the appearance of the molded article prepared just after the molding was evaluated.

The results are shown in Table 3.

Furthermore, the adhesions (adhesion properties) (1) and (2) of the coating were evaluated in accordance with the following methods. The results are shown in Table 3.

(1) Initial Coating Adhesion

The initial coating adhesion test was carried out in accordance with JIS K 5600, Part 5: mechanical properties of coatings, Section 6: adhesion (cross-cut method). The adhesion of the coating was evaluated by the following 6 grades of 0 to 5 based on the classification of the test result as described in JIS K 5600.

Evaluation with 6 Grades

0 . . . The edge of a cut is completely smooth and no peeling is observed in each lattice piece.
1 . . . Small peeing of coating is observed at the intersection of the cuts. The cross-cut portion affected is not clearly more than 5%.
2 . . . Peeling of the coating is observed along the edge of the cut and/or at the intersection thereof. The cross-cut portion affected is clearly more than 5% and is not clearly more than 15%.
3 . . . Large peeling of the coating is observed partially or wholly along the edge of the cut, and/or various parts of the lattice piece are peeled partially or wholly. The cross-cut portion affected is clearly more than 15% and is not clearly more than 35%.
4 . . . Large peeling of the coating is observed partially or wholly along the edge of the cut, and/or several lattice pieces are peeled partially or wholly. The cross-cut portion affected is not clearly more than 35%.
5 . . . Peeling not classified in the above grades 0 to 4 is observed.

(2) Coating Adhesion After Water Resistance Test

In accordance with JIS K 5600 Part 6: Chemical properties of coating, Section 2: liquid resistance (water dipping method), a specimen was dipped in warm water heated at 40±1° C. for 240 hr. After the completion of the defined test period, the specimen was taken out and allowed to stand at room temperature for 24 hr. Thereafter the adhesion of the coating was evaluated by the 6 grades of 0 to 5 in accordance with the test result classification as described in the method defined in the JIS K 5600.

Examples 23 to 24

A box-like mold for in-mold coating molding (projection area: about 400 cm$^2$) was installed in a toggle type injection molding machine for in-mold coating molding having a mold clamping force of 350 tf equipped with a coating agent (paint) injecting apparatus. The mold was clamped by applications of a mold clamping force of 100 tf as a first mold clamping force, and to the mold cavity in this state, a polypropylene resin composition heated at 180° C. was injected. In the injection filling of the resin composition, the first mold clamping force is lower than the filling pressure of the resin composition and thereby the parting plane of the mold is slightly opened. Just at the completion of the injection, the mold clamping force was increased to 200 tf as the secondary mold clamping force.

At the time of application of the secondary mold clamping force, the inner pressure in the center part of the mold was 40 MPa. In this time, the mold temperature was set to 100° C. at which the paint curing was induced, by circulating water of a pressurized water type mold temperature regulator.

The polypropylene resin composition filled in the cavity in a state of application of the secondary mold clamping force was cooled in the mold for 90 sec and thereby solidified in an extent such that the surface can withstand the flowing of the coating agent.

Subsequently, the mold was opened with an opening of 0.2 mm, and the paint composition was filled in between the resin molded product surface and the mold cavity surface at a pressure of 15 MPa from the paint injector equipped in the mold. Thereafter, the mold was closed again and the mold was kept in a state of application of a mold clamping force of 10 tf for 120 sec to cure the paint composition, and then the molded article was taken out by opening the mold.

With regard to the molded article taken out, the evaluation was carried out similarly to Example 1.

The results are shown in Table 3.

Examples 25 and 26

A box-like mold for in-mold coating molding (projection area: about 400 cm$^2$) was installed in a toggle type injection molding machine for in-mold coating molding having a mold clamping force of 350 tf equipped with a coating agent (paint) injecting apparatus. To the mold cavity in a state that the mold was opened with an initial opening of 5 mm, a polypropylene resin composition heated at 180° C. was injected. Just at the completion of the injection, the mold was closed and further, the mold clamping force was increased to 200 tf. The time taken from the completion of the injection to the increasing of the mold clamping force to 200 tf was about 1 sec. At the time of application of the mold clamping force, the inner pressure in the center part of the mold was 60 MPa. In this time, the mold temperature was set to 100° C. at which the paint curing was induced by circulating water of a pressurized water type mold temperature regulator.

The polypropylene resin composition filled in the cavity in a state of application of the mold clamping force was cooled in the mold for 90 sec and thereby solidified in an extent such that the surface can withstand the flowing of the coating agent.

Subsequently, the mold was opened with an opening of 0.3 mm, the paint composition was filled in between the resin molded product surface and the mold cavity surface at a pressure of 10 MPa from the paint injector equipped in the mold. Thereafter, the mold was closed again and the mold was kept in a state of application of a mold clamping force of 10 tf for 120 sec to cure the paint composition, and then the molded article was taken out by opening the mold.

With regard to the molded article taken out, the evaluation was carried out similarly to Example 1.

The results are shown in Table 3.

TABLE 3-1

|  | Polypropylene resin composition | Paint composition | Coating condition |
| --- | --- | --- | --- |
| Example 1 | P-3 | A-1 | Good |
| Example 2 | P-3 | A-2 | Good |
| Example 3 | P-3 | A-3 | Good |
| Example 4 | P-3 | A-4 | Good |
| Example 5 | P-3 | A-5 | Good |
| Example 6 | P-3 | A-6 | Good |

TABLE 3-1-continued

|  | Polypropylene resin composition | Paint composition | Coating condition |
|---|---|---|---|
| Example 7 | P-3 | A-7 | Good |
| Example 8 | P-3 | A-8 | Good |
| Example 9 | P-4 | A-1 | Good |
| Example 10 | P-4 | A-2 | Good |
| Example 11 | P-4 | A-3 | Good |
| Example 12 | P-4 | A-4 | Good |
| Example 13 | P-4 | A-5 | Good |
| Example 14 | P-4 | A-6 | Good |
| Example 15 | P-4 | A-7 | Good |
| Example 16 | P-4 | A-8 | Good |
| Example 17 | P-1 | A-1 | Good |
| Example 18 | P-2 | A-1 | Good |
| Example 19 | P-5 | A-1 | Good |
| Example 20 | P-6 | A-1 | Good |
| Example 21 | P-7 | A-1 | Good |
| Example 22 | P-8 | A-1 | Good |

TABLE 3-2

|  | Appearance of molded article just after molding | | | Coating adhesion | |
|---|---|---|---|---|---|
|  | Coating blister | Coating peeling | Gloss | Initial | After water resistance test |
| Example 1 | None | None | Good | 0 | 0 |
| Example 2 | None | None | Good | 0 | 0 |
| Example 3 | None | None | Good | 0 | 0 |
| Example 4 | None | None | Good | 0 | 0 |
| Example 5 | None | None | Good | 0 | 0 |
| Example 6 | None | None | Good | 0 | 0 |
| Example 7 | None | None | Good | 0 | 0 |
| Example 8 | None | None | Good | 0 | 0 |
| Example 9 | None | None | Good | 0 | 0 |
| Example 10 | None | None | Good | 0 | 0 |
| Example 11 | None | None | Good | 0 | 0 |
| Example 12 | None | None | Good | 0 | 0 |
| Example 13 | None | None | Good | 0 | 0 |
| Example 14 | None | None | Good | 0 | 0 |
| Example 15 | None | None | Good | 0 | 0 |
| Example 16 | None | None | Good | 0 | 0 |
| Example 17 | None | None | Good | 0 | 0 |
| Example 18 | None | None | Good | 0 | 0 |
| Example 19 | None | None | Good | 0 | 0 |
| Example 20 | None | None | Good | 0 | 0 |
| Example 21 | None | None | Good | 0 | 0 |
| Example 22 | None | None | Good | 0 | 0 |

TABLE 3-3

|  | Polypropylene resin composition | Paint composition | Coating condition |
|---|---|---|---|
| Example 23 | P-3 | A-1 | Good |
| Example 24 | P-4 | A-1 | Good |
| Example 25 | P-3 | A-1 | Good |
| Example 26 | P-4 | A-1 | Good |
| Comparative Example 1 | Q-1 | A-1 | Inferior adhesion |
| Comparative Example 2 | Q-2 | A-1 | Inferior adhesion |
| Comparative Example 3 | Q-3 | A-1 | Inferior adhesion |
| Comparative Example 4 | P-3 | B-1 | Inferior adhesion |
| Comparative Example 5 | P-3 | B-2 | Containing bubbles |
| Comparative Example 6 | P-3 | B-3 | not whole surface coated |
| Comparative Example 7 | P-3 | B-4 | not whole surface coated |
| Comparative Example 8 | P-3 | B-5 | Inferior adhesion |
| Comparative Example 9 | P-3 | B-6 | Inferior gloss |
| Comparative Example 10 | P-3 | B-7 | Inferior curing |
| Comparative Example 11 | P-3 | B-8 | not whole surface coated |

TABLE 3-4

|  | Appearance of molded article just after molding | | | Coating adhesion | |
|---|---|---|---|---|---|
|  | Coating blister | Coating peeling | Gloss | Initial | After water resistance test |
| Example 23 | None | None | Good | 0 | 0 |
| Example 24 | None | None | Good | 0 | 0 |
| Example 25 | None | None | Good | 0 | 0 |
| Example 26 | None | None | Good | 0 | 0 |
| Compara. Example 1 | Occurred | Observed | Good | 5 | 5 |
| Compara. Example 2 | Occurred | Observed | Good | 5 | 5 |
| Compara. Example 3 | Occurred | Observed | Good | 3 | 4 |
| Compara. Example 4 | Occurred | Observed | Good | 4 | 4 |
| Compara. Example 5 | Occurred | Observed | Good | 2 | 2 |
| Compara. Example 6 | None | Observed | Good | 2 | 3 |
| Compara. Example 7 | None | Observed | Good | 1 | 2 |
| Compara. Example 8 | Occurred | Observed | Good | 3 | 4 |
| Compara. Example 9 | None | Observed | Not Good | 0 | 1 |
| Compara. Example 10 | Occurred | Observed | Good | 5 | 5 |
| Compara. Example 11 | None | Observed | Good | 2 | 3 |

The invention claimed is:

1. An in-mold coating molded article obtained by coating the surface of a resin molded product comprising a hydroxyl group-containing polypropylene resin composition (A) with a paint composition for in-mold coating (B), wherein the hydroxyl group-containing polypropylene resin composition (A) comprises a polypropylene resin (i), an additive rubber (ii) and optionally a polymer compound (iii) other than the polypropylene resin (i) and the additive rubber (ii), the total hydroxyl value of the polypropylene resin (i), the additive rubber (ii) and the optional polymer compound (iii) is from 1 to 40 (KOH mg/g), the hydroxyl group-containing polypropylene resin composition (A) has a rubber component content (total of the amount of the additive rubber (ii) and the amount of components soluble in n-decane at 23° C. of the polypropylene resin (i) and the optional polymer compound (iii)) of from 15 to 80% by mass based on 100% by mass of the total amount of the rubber component and the resin component other than the rubber component, the paint composition for in-mold coating (B) comprises:

100 parts by mass of a vehicle component (a) comprising 10 to 70% by mass of an oligomer having at least two (meth)acrylate groups and 90 to 30% by mass of an ethylenically unsaturated monomer copolymerizable with the oligomer, 5 to 35 parts by mass of a (meth)acryl modified chlorinated polyolefin (b) having a chlorine content of from 2 to 40% by mass, 0.5 to 5 parts by mass of an organic peroxide polymerization initiator (c), and 2 to 20 parts by mass of a polyisocyanate compound (d).

2. The in-mold coating molded article according to claim 1, wherein the hydroxyl group-containing polypropylene resin composition (A) is a resin composition having a hydroxyl value of from 1 to 40 (KOH mg/g) and comprising:

20 to 95% by mass of the polypropylene resin (i) comprising at least one polypropylene selected from a propylene homopolymer, a propylene block copolymer and a propylene random copolymer, and 5 to 80% by mass of the additive rubber (ii) (the total amount of the polypropylene resin (i) and the additive rubber (ii) being 100% by mass), at least one of the polypropylene resin (i) and the additive rubber (ii) having a hydroxyl group.

3. The in-mold coating molded article according to claim 1, wherein the hydroxyl group-containing polypropylene resin composition (A) is a resin composition having a hydroxyl value of from 1 to 40 (KOH mg/g) and comprising:

20 to 95% by mass of a polypropylene resin (i) comprising at least one polypropylene selected from a propylene homopolymer, a propylene block copolymer and a propylene random copolymer, 5 to 80% by mass of the additive rubber (ii) (the total amount of the polypropylene resin (i) and the additive rubber (ii) being 100% by mass), and 1 to 60% by mass of the polymer compound (iii) other than the polypropylene resin (i) and the additive rubber (ii), based on 100% by mass of the total of the polypropylene resin (i) and the additive rubber (ii), at least one of the polypropylene resin (i), the additive rubber (ii) and the polymer compound (iii) having a hydroxyl group.

4. The in-mold coating molded article according to claim 1, wherein the hydroxyl group-containing polypropylene resin composition (A) is a polypropylene resin composition containing a hydroxyl group-containing polypropylene.

5. The in-mold coating molded article according to any one of claims 1 to 4, wherein the additive rubber (ii) is an ethylene α-olefin copolymer.

6. The in-mold coating molded article according to claim 1, wherein the hydroxyl group-containing polypropylene resin composition (A) further contains an inorganic filler.

7. A process for preparing an in-mold coating molded article, which process comprises:

injecting a melt of the hydroxyl group-containing polypropylene resin composition (A) as claimed in claim 1 into a mold cavity of a mold composed of a stationary mold and a movable mold with keeping the mold under a prescribed mold clamping pressure at a mold temperature lower than the melting point of the polypropylene resin component in the hydroxyl group-containing polypropylene resin composition (A) and not less than the temperature at which the paint composition for in-mold coating (B) as claimed in claim 1 is cured, cooling and solidifying the melt in an extent capable of withstanding the fluid pressure of the paint composition (B) by hold pressure application for a prescribed time, opening the mold slightly to form a space between the resulting resin molded product and the mold cavity surface, injecting the paint composition (B) into the space, increasing the mold clamping pressure again and maintaining the mold clamping condition to cure the paint composition (B), and then taking out an in-mold coating molded article.

8. A process for preparing an in-mold coating molded article, which process comprises:

injecting a melt of the hydroxyl group-containing polypropylene resin composition (A) as claimed in claim 1 into a mold cavity of a mold composed of a stationary mold and a movable mold with keeping the mold under a prescribed primary mold clamping pressure at a mold temperature lower than the melting point of the polypropylene resin component in the hydroxyl group-containing polypropylene resin composition (A) and not less than the temperature at which the paint composition for in-mold coating (B) as claimed in claim 1 is cured, during the injection or after completion of the injection, increasing the mold clamping force to a secondary mold clamping force and keeping the melt for a prescribed time to cool and solidify the melt in an extent capable of withstanding the fluid pressure of the paint composition (B), opening the mold slightly to form a space between the resulting resin molded product and the mold cavity surface, injecting the paint composition (B) into the space, increasing the mold clamping pressure again and maintaining the mold clamping condition to cure the paint composition (B), and then taking out an in-mold coating molded article.

9. A process for preparing an in-mold coating molded article, which process comprises:

injecting a melt of the hydroxyl group-containing polypropylene resin composition (A) as claimed in claim 1 into a mold cavity of a mold composed of a stationary mold and a movable mold, with keeping the mold at a mold temperature lower than the melting point of the polypropylene resin component in the hydroxyl group-containing polypropylene resin composition (A) and not less than the temperature at which the paint composition for in-mold coating (B) as claimed in claim 1 is cured, in a state that the mold is opened with a prescribed opening, during the injection or after completion of the injection, increasing the mold clamping force to a prescribed mold clamping force and keeping the melt for a prescribed time to cool and solidify the melt in an extent capable of withstanding the fluid pressure of the paint composition (B), opening the mold slightly to form a space between the resulting resin molded product and the mold cavity surface, injecting the paint composition (B) into the space, increasing the mold clamping pressure again and maintaining the mold clamping condition to cure the paint composition (B), and then taking out an in-mold coating molded article.

* * * * *